United States Patent

Terakado et al.

[11] Patent Number: 6,096,445
[45] Date of Patent: Aug. 1, 2000

[54] SUBSTRATE FOR A MAGNETIC RECORDING MEDIUM, THE MAGNETIC RECORDING MEDIUM, AND A METHOD OF PRODUCING THE SAME

[75] Inventors: Masatomo Terakado; Youichi Inomata; Yotsuo Yahisa, all of Odawara; Akira Ishikawa, Kodaira; Kiyoshi Akamatsu, Yokohama, all of Japan

[73] Assignee: Hitachi, Ltd., Tokyo, Japan

[21] Appl. No.: 09/065,595

[22] Filed: Apr. 24, 1998

[30] Foreign Application Priority Data

Apr. 25, 1997 [JP] Japan ................................. 9-121521
Apr. 22, 1998 [JP] Japan ................................ 10-126629

[51] Int. Cl.$^7$ ........................................................ G11B 5/66
[52] U.S. Cl. ........................ 428/694 T; 428/694 TR; 428/694 SG; 428/900
[58] Field of Search .................. 428/694 T, 694 TR, 428/694 SG, 900

[56] References Cited

U.S. PATENT DOCUMENTS

| | | |
|---|---|---|
| 5,062,021 | 10/1991 | Ranjan ................................. 360/135 |
| 5,413,835 | 5/1995 | Ikeda ................................... 428/141 |
| 5,427,867 | 6/1995 | Kogure ................................ 428/611 |
| 5,474,830 | 12/1995 | Yamaguchi .......................... 428/141 |
| 5,506,017 | 4/1996 | Ranjan ................................ 428/65.7 |
| 5,550,696 | 8/1996 | Nguyen ............................... 360/135 |
| 5,586,040 | 12/1996 | Baumgart ......................... 364/474.08 |
| 5,637,393 | 6/1997 | Ueda ................................... 428/332 |
| 5,650,237 | 7/1997 | Satoh .................................. 428/611 |
| 5,662,984 | 9/1997 | Honda ................................. 428/141 |
| 5,705,287 | 1/1998 | Doerner ......................... 428/694 TS |
| 5,843,561 | 12/1998 | Uwazumi ............................ 428/141 |

FOREIGN PATENT DOCUMENTS

| | | |
|---|---|---|
| 3-272018 | 12/1991 | Japan . |
| 8-147662 | 6/1996 | Japan . |
| 8-180401 | 7/1996 | Japan . |
| 9-259418 | 10/1997 | Japan . |

*Primary Examiner*—Leszek Kiliman
*Attorney, Agent, or Firm*—Kenyon & Kenyon

[57] ABSTRACT

A non-ferromagnetic metal thin film is formed on a non-ferromagnetic substrate such as a glass substrate. A target principally containing an intermetallic compound is sputtered to form a fine structure having discrete bumps provided on the surface of the substrate. In addition, ring bumps different from the bumps of the intermetallic compound are formed on a contact start/stop zone by a laser or other means, thus completing a magnetic recording medium.

2 Claims, 13 Drawing Sheets

CSS ZONE

DATA ZONE

SUBSTRATE FOR A MAGNETIC RECORDING MEDIUM, THE MAGNETIC RECORDING MEDIUM, AND A METHOD OF PRODUCING THE SAME

BACKGROUND OF THE INVENTION

The present invention relates to magnetic recording media, such as magnetic disks, which can contribute to the provision of a magnetic disk unit having excellent slide-resistance reliability, to the substrate for constituting such magnetic recording media, and to a method of producing the magnetic recording media.

In the field of recent magnetic recording media, high-density recording of information has been advanced in connection with the small-size and large-capacity of magnetic disk units. In order to achieve high-density recording, it is important to reduce the distance between the magnetic recording medium and the head. When the magnetic recording medium and the head have smooth surfaces, the place where both are made in contact at the time of contact start/stop (CSS) has high stiction property. Thus, there is some possibility that an accident due to the stickiness occurs under the presence of a lubricant. Therefore, it was proposed that the region (CSS zone) in which the head contacts with the magnetic medium at the time of CSS is required to have low stickiness, and that the CSS zone should have higher bumps scattered than the region (data zone) in which information is stored on the medium in order for the floating margin to the head to be as wide as possible within the data zone. For example, as disclosed in JP-A-3-272018, the entire surface of the substrate of the magnetic recording medium is mechanically processed to have bumps of a roughness (Rp) less than 2.54 nm, and then only the CSS zone is processed by laser to have ring-shaped bumps. Also, in JP-A-8-147662, a metal capable of forming carbide is sputtered on the entire surface of a carbon substrate to form highly close bumps.

JP-A-8-180401 and JP-A-9-259418 disclose a background of the present invention.

SUMMARY OF THE INVENTION

Accordingly, it is an object of the invention to provide a magnetic recording medium capable of satisfying both excellent magnetic recording characteristics and high slide-resistance reliability.

It is another object of the invention to provide a method of producing the magnetic recording medium according to the above object of the invention, and the substrate for this magnetic recording medium.

Although JP-A-3-272018 describes that the method can provide a magnetic recording medium of excellent CSS characteristic, it is not clear how high the resistance against the stickiness is when the head unexpectedly contacts with the medium of which the substrate surface has bumps of a roughness less than 2.54 nm in the data zone, while data is being recorded or reproduced. In addition, it is difficult to effectively process a glass substrate by laser. Moreover, although JP-A-8-147662 describes that both magnetic recording characteristics and slide-resistance reliability are excellent, it is not clear whether or not other substrates than carbon substrate can attain satisfactory slide-resistance reliability.

The present invention is to solve the problems in those prior arts.

In order to achieve the objects of the invention, the following processes are executed. A material chiefly containing an intermetallic compound is used as a target. The material is sputtered on the substrate of a magnetic recording medium to form minute bumps chiefly containing the metal compound on the surface of the substrate, and then processed by laser to form ring-type bumps only in the CSS zone. As to a glass substrate, after a non-ferromagnetic metal thin film is deposited on the glass substrate by sputtering, and then bumps chiefly containing an intermetallic compound are formed thereon. Moreover, a magnetic recording layer, a protective layer and a lubricant layer are sequentially deposited on the substrate which has bumps chiefly containing the intermetallic compound, and the ring-type bumps formed by laser. By this method, it is possible to easily produce a magnetic recording medium that can simultaneously satisfy the magnetic recording characteristics and the slide-resistance reliability. These bumps can also be formed after the magnetic layer is deposited. In addition, it is possible that the material chiefly containing an intermetallic compound is used as a target, and sputtered on the substrate with the regions except the CSS zone being masked, so that minute bumps containing the intermetallic compound can be emphatically formed on the CSS zone. This substrate can be used to achieve the objects of the invention.

A description will be made of a process for creating ring-type bumps on a glass substrate by laser. The raw material for the glass substrate is optically transparent to light of wavelengths ranging from 400 to 2000 nm, and absorbs less energy of laser. Thus, so far, laser of wavelengths, such as carbon dioxide laser, which can be absorbed by glass has been used, and a special glass material which effectively absorbs particular wavelengths has been tried to use as the substrate. The present invention is to provide processes for depositing a non-ferromagnetic metal thin film on a substrate of soda lime glass which is widely used as a substrate for magnetic recording media, and efficiently making ring-type bumps by laser of relatively low output. These processes can form ring-type bumps on a general-purpose glass substrate by an easy-to-handle solid-state laser. The amount that the substrate is processed by laser irradiation depends on the amount of energy cast at the small portion on which laser beam is irradiated. The amount of cast energy is the remainder of subtracting the amount of energy flowing out by thermal conduction from the amount of energy absorbed by the small portion at which laser beam has been irradiated. It is generally known that the soda lime glass exhibits permeability of 90% or above against light of wavelengths ranging from 400 to 2000 nm. Thus, it is considerably difficult to directly process a soda lime glass substrate by laser. On the other hand, the metal material, even in a form of thin film, exhibits substantially no permeability against the above-mentioned range of wavelengths of light. As a metal material, aluminum, silver or copper exhibits high reflectivity against that range of wavelengths of light, whereas nickel, chromium or other alloys show relatively low reflectivity. Thus, the latter metal materials can absorb laser energy with ease. Once the material is evaporated from or liquefied on the surface by laser, laser beam is scattered and further easily absorbed by the material. The thermal conductivity of metal, for example, aluminum alloy A5083, is about 100 W/(m·K) at room temperature. Even stainless steel SUS304 of low thermal conductivity has a thermal conductivity of 10 W/(m·K) or above, while the thermal conductivity of glass is around 1 W/(m·K).

Thus, a thin film of a metal material which absorbs a laser beam of desired wavelengths is deposited on a substrate of low thermal conductivity such as glass substrate. As a result, the amount of cast energy mentioned above can be increased to thereby enable the substrate to be processed effectively by laser.

In addition, it is possible that after a thin film of a substance having a low thermal conductivity such as silicon dioxide is formed on a substrate of low thermal conductivity such as glass substrate, a thin film of the above-mentioned metal material is deposited on the silicon oxide film.

Moreover, a substrate made of aluminum alloy or the like may be of course used if the power of available laser is not limited.

The summary of the invention will be described before the description of preferred embodiments. First, a description will be made of a method for producing, by sputtering, bumps chiefly containing an intermetallic compound on a glass substrate or the like with a thin film of a metal material previously deposited thereon for absorbing a laser beam of desired wavelengths. In order to form bumps, it is first necessary that the attractive force between the atoms constituting the bumps be larger than the force that causes the atoms to diffuse toward the substrate surface, into planarization. In addition, after the formation of bumps, those atoms are required substantially not to diffuse a long distance, and not to react with the adjacent layers. Therefore, the substance of the bumps should be constituted by atoms of not a single element but two or more elements bonded to each other. Moreover, since it is desired that the respective atoms substantially should not react with the adjacent layers, those atoms are required to be other than reactive atoms of such elements as alkali metal, alkaline earth metal and halogen elements. Thus, intermetallic compounds are suited to the substance of which the bumps are made. Here, the intermetallic compound is a substance composed of two or more metal elements at a constant ratio, other than alkali metal and alkaline earth metal, and it has generally a crystal structure different from the single-element substance. Use of an intermetallic compound is desirable from the standpoint of suppressing the constituent atoms from diffusing because the bumps need not be heated after being produced.

The process in which the bumps chiefly containing an intermettalic compound are formed will be described with reference to FIGS. 1, 2, 3 and 4. FIG. 1 shows a part of an A–B system phase diagram having an intermetallic compound phase. FIGS. 2, 3 and 4 are schematic diagrams showing the process of producing bumps. In FIG. 1, the ordinate indicates temperature, and the abscissa the concentration of atom B of system A–B. In FIG. 1, it is shown that if the concentration of atom B is, for example, X1 at point C, the existence of phase $\alpha$ and phase $\theta$ at a ratio of b:a at a temperature of T1 is stable from the standpoint of energy. Thus, phase $\alpha$ and phase $\theta$ are generated at a ratio of b:a when the concentration of atom B is X1 and when the compound is kept at a temperature T1 for a long time enough to cause diffusion. Also, only phase $\theta$ can be obtained when the concentration of atom B is X2 and similarly when the compound is kept at a temperature of T1.

The process of forming bumps will be mentioned with reference to FIGS. 2, 3 and 4. Since FIGS. 2, 3 and 4 show the model of the process for producing bumps, the arrangement or number of atoms is not necessarily coincident with that in the actual process.

First, when the target of concentration X1 shown in FIG. 1 is sputtered, atoms A and atoms B reach the surface of a substrate 1, and bond each other to form a crystal nucleus 2 of intermetallic compound $\theta$ (see FIG. 2). The atoms A and B arrive at the surface of the substrate continuously from one after another. Both A-atoms 3 and B-atoms 4 continuously reach all of the places on the substrate 1 including the place where the crystal nucleus 2 is located, at the same probability. Since the production of the intermetallic compound is stable from the standpoint of energy rather than the state of free atoms, a driving force to diffuse is exerted on those atoms until the composition comes to the above-mentioned equilibrium (the ratio of $\alpha$ and $\theta$=b:a), and thus the crystal nucleus 2 of the intermetallic compound $\theta$ continues to grow (FIG. 3). In this case, it is assumed that the diffusion coefficient on the substrate surface is large enough to make the intermetallic compound be formed even at a low temperature of 600 K or below. Since the crystal nucleus 2 generally tends to be stabilized to minimize its surface area and the surface energy, it inclines to take substantially a hemispheric shape and become large in its size. The reason for the size of a single crystal nucleus to become large will be clear from the fact that if a similar shape is kept, the surface area and the number of atoms are proportional to the square of the radius and the cube of the radius, respectively.

The crystal nucleus 2 grows to become a bump 21 that is made of the intermetallic compound. When the atoms continue to diffuse for enough time and reach the equilibrium at concentration X1, the intermetallic compound contains a phase and $\theta$ phase. These atoms are freely diffused since there are substantially no B-atoms with which they react. Most of the atoms are uniformly distributed on the surface on which the diffusion coefficient is large (see FIG. 4).

The above-mentioned process depends on time. For example, the diffusion speed increases with the increase of the substrate temperature, and thus the bump 21 composed of an intermetallic compound can be grown to be higher within a constant time. In addition, the frequency at which the crystal nucleus 2 is generated is affected by the material of an under layer formed on the substrate 1. Therefore, the density of the bumps 21 composed of an intermetallic compound can be set within a desired range by selecting a proper under layer material. The under layer material may be any substance provided that the composition and temperature are properly specified.

The target that is used in the present invention may be any system which is able to generate an intermettalic compound as described above. Preferably, the A-atom 3 should be aluminum Al because aluminum Al is easy to diffuse even at low temperatures. In addition, as the B-atom 4, a high melting-point metal element (Co, Cr, Cu, Fe, Mn, Mo, Ni, Pd, Pt, V, W or the like) of which the melting point is 1000° C. or above should be selected because they can contribute to the improvement of intermetallic compounds in thermal stability, to the reduction of reactivity of an intermettalic compound with the films formed under and on the bump of this intermetallic compound, and to the high-density production of minute bumps composed of the intermetallic compound. Moreover, from the viewpoint of production process and cost of target, it is preferred that the A-atom 3 should be aluminum Al and that the B-atom 4 be selected from the elements of Cr, Co, Mo, V and W.

According to the invention, bumps of intermetallic compound are formed on the substrate surface, and then processed by laser to produce ring-type bumps only within the CSS zone. When the substrate is rotated at a speed corresponding to the frequency of laser pulse, the ring-type bumps can be formed to regularly arrange at constant intervals. If a glass substrate is used, a non-ferromagnetic metal film is formed by sputtering as an under layer film on the substrate before the production of intermettalic-compound bumps, thus enabling the later process to use laser. The bumps of intermetallic compound formed on the substrate surface are worked by laser together with the metal thin film of the under layer film.

According to the invention, it is possible to produce a magnetic recording medium that does not easily stick to the head and that is excellent in its resistance to slide, and thus provide a magnetic disk unit excellent in slide-resistance reliability.

Moreover, the widely used substrate for use in magnetic disks is an aluminum alloy substrate plated thereon with nickel phosphorus. However, since the thermal capacity of the substrate is large, it is difficult to work the substrate by laser. This problem is important and should be solved since it is associated with the high-density production of bumps which is the recent tendency. That is, if the CSS resistance is tried to improve with the stickiness avoided, a larger number of bumps must be formed to arrange. An equal amount of energy is required to form each of the bumps. In order to form as many bumps as possible in a unit time, it is necessary to increase the laser output. However, from the low-cost and easy-to-handle point of view, it is desirable to use a process that can be performed by a smaller amount of laser power. Thus, the energy required to form a single bump must be much reduced as compared with the prior art. The present invention, in view of the above problem, is to make it possible to easily construct a magnetic disk with ring-type bumps formed on the metal substrate by small laser power and which is excellent in the slide-resistance reliability.

To achieve the objects of the invention, an alloy film is laminated on the substrate that has a silicon (hereinafter, abbreviated Si) oxide film or nitride film previously formed thereon, and then the substrate is processed by laser so that ring-type bumps are formed only within the CSS zone. In addition, the target containing an intermetallic compound is sputtered to form lower bumps than those previously formed by laser, on all the areas of the substrate except the CSS zone so that, in operation, the head can be stably floated on the data zone of the disk. Also, a magnetic layer, protective layer and lubricant layer are sequentially deposited over the substrate at the place where these bumps are formed. Thus, this method can easily construct a magnetic disk which satisfies both magnetic recording characteristics and slide-resistance reliability. In this case, the process for producing the bumps by laser may be performed after the sputtering for bumps. Moreover, either one or both of the laser process and sputtering process may be carried out after the formation of the magnetic recording layer.

First, a description will be made of the process for producing ring-type bumps on the substrate by laser. When the substrate is worked by laser, the amount of work depends on the amount of energy cast into the very small area on which a laser beam is irradiated. This cast amount of laser is the remainder of subtracting the amount of energy flowing out by thermal conductivity from the amount of energy absorbed by the very small area on which the laser beam is irradiated. The metal material of even thin film has substantially no transmissivity against the above-mentioned range of wavelengths. The reflectivity of metal materials, such as aluminum, silver and copper is high against the above range of wavelengths, whereas that of nickel, chromium or other alloys is relatively low. These materials can easily absorb laser energy. Once the material is evaporated from or liquefied on the surface by laser irradiation, the laser beam is scattered and more easily absorbed. On the other hand, the thermal conductivity of metal, for example, aluminum alloy A5083 is substantially 100 W/(m·K) at normal temperature. Even stainless steel SUS304 of low conductivity has a thermal conductivity of more than 10 W/(m·K), whereas the thermal conductivity of glass is around 1 W/(m·k). Thus, a film of a low-conductivity substance such as silicon dioxide is deposited on a high-conductivity substrate such as aluminum alloy substrate, and then a metal thin film for absorbing a laser beam of desired wavelengths is formed on the substrate. This makes it possible to increase the cast amount of energy, and to effectively work the substrate by laser. If the disk is rotated at a rate corresponding to the frequency of laser pulse, the ring-type bumps can be formed to arrange at constant intervals.

The process for producing minute bumps by sputtering can be described as above with reference to FIGS. 1, 2, 3 and 4. This process depends on time. For example, the diffusion speed is increased with the increase of substrate temperature, and the bumps can be grown to be high within a constant time. The frequency at which the crystal nucleus is generated is affected by the under layer material. Thus, a desired bump density can be obtained by proper selection of the material. The under layer material may be any material provided that temperature is properly specified.

The above-mentioned mechanism is applied not only to the binary system but also to ternary system or above. The target used in the invention may be any system as long as an intermetallic compound can be generated as described above. Preferably, the A-atom should be aluminum Al because aluminum Al is easy to diffuse even at low temperatures. In addition, as the B-atom, a high melting-point metal element (Co, Cr, Cu, Fe, Mn, Mo, Ni, Pd, Pt, V, W or the like) of which the melting point is 1000° C. or above should be selected because they can contribute to the improvement of intermetallic compounds in thermal stability, to the reduction of reactivity of an intermettalic compound with the films formed under and on the bumps of this intermetallic compound, and to the high-density production of minute bumps composed of the intermetallic compound. Moreover, from the viewpoint of production process and cost of target, it is preferred that the A-atom should be aluminum Al and that the B-atom be selected from the elements of Cr, Co, Mo, V and W.

According to the invention, since the metal substrate can be worked by laser of smaller power, a magnetic disk that does not easily stick to the head, and is excellent in the resistance to slide can be produced by more simple apparatus, and thus it is possible to provide a magnetic disk unit that is excellent in the slide-resistance reliability.

DESCRIPTION OF THE PREFERRED EMBODIMENTS

Embodiment 1

A magnetic recording medium as a first embodiment of the invention will be described with reference to drawings.

Figure 5:
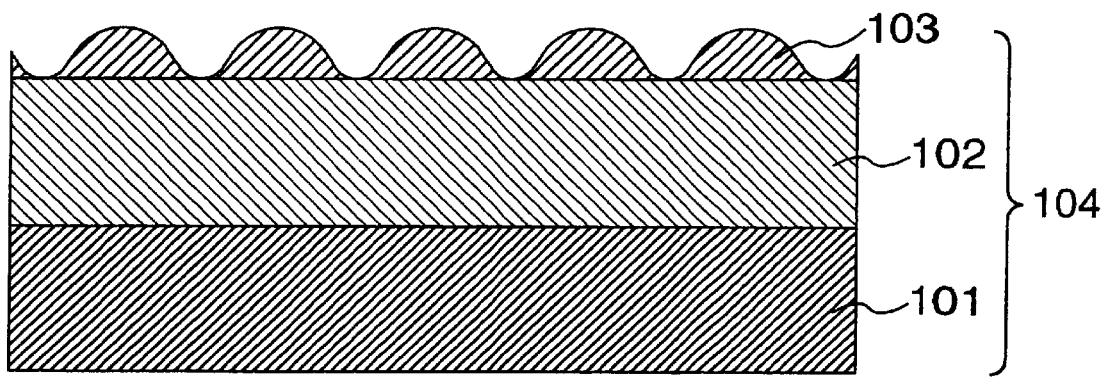
FIG. 5 is a diagram showing an embodiment 1 of the invention in which minute bumps composed of an intermetallic compound are formed.

FIG. 5 is a cross-sectional diagram of a magnetic recording medium of this embodiment, showing bumps of an intermetallic compound formed on the substrate.

First, a disk-shaped glass substrate 101 is prepared which is 95 mm in outer diameter, 25 mm in inner diameter and 0.8 mm in thickness, and which has a concentrically circular aperture provided at its center. This substrate is heated by a lamp in vacuum in order to degas. The power of the heating lamp is controlled to heat the substrate 101 to a high temperature at which the substrate is not deformed. The temperature is typically set in the range of, for example, 100 to 250° C. Then, an alloy layer 102 composed of cobalt (hereinafter, abbreviated Co), chromium (abbreviated Cr) and tantalum (abbreviated Ta) is deposited on the substrate 101. The composition ratio of Cr and Ta is, for examples 30 mass % and 8 mass % respectively, and the composition of the alloy layer 102 is substantially non-ferromagnetic. The alloy layer 102 was formed to have four different values of thickness, for example, 25, 50, 100 and 200 nm on separate substrates. Since the thermal capacity of the whole film is decreased as the film is made thinner, the substrate can be worked by smaller laser power. In addition, we examined an alloy of Cr and silicon (abbreviated Si), an alloy of Cr and titanium (abbreviated Ti), an alloy of Cr and vanadium (abbreviated V), an alloy of nickel (abbreviated Ni) and Ti, an alloy of Ni and Al, and a ternary alloy of three elements Co, Cr and zirconium (abbreviated Zr), as the material of which the alloy layer 102 is made. The respective materials have different physical property values such as absorption efficiency and thermal conductivity to laser. In addition, both the process for thin film deposition and the process for working by laser are often limited in their possible conditions by the manufacturing equipment side. Thus, for the actual production, it is advantageous to examine various different parameters.

The alloy layer 102 on the substrate 101 has a function to form bumps when it is irradiated thereon with pulse laser. The alloy layer 102 may be made of any other material as long as it has the above-mentioned function and effect. In addition, although the substrate 101 used is, for example, the glass substrate made by Nikon (Inc.) of Japan, it may be any material if it has non-ferromagnetic property, and is flat and strong enough.

Then, the substrate 101 is processed for a predetermined time in a processing chamber which has a helium introducing mechanism, and the substrate is cooled to a certain temperature enough to form bumps 103 composed of an intermetallic compound of Al and Co. However, this cooling process will not be necessary if the substrate 101 is cooled to the certain temperature by radiation and conduction while it is carried from a processing chamber to another processing chamber. The gas to be used may be anything if it has a cooling effect. In addition, if the substrate temperature is too low, it should be again heated to the certain temperature.

Thereafter, a target of Al and Co is sputtered on the alloy layer 102 to form the bumps 103 made of the intermetallic compound of Al and Co.

The apparatus used to produce the magnetic recording medium of this embodiment is the in-line sputtering apparatus, MDP1100 made by Varian Inc. in USA. This apparatus has a substrate heating chamber, a substrate cooling chamber and a plurality of substrate processing chambers for magnetron sputtering. Other apparatus may be used if it is capable of substrate temperature control and sputtering. In addition, it is desired that the substrate be maintained under a pressure of $2.0 \times 10^{-5}$ Pa or below in order to be prevented from oxidation during the respective processes for producing the alloy layer 102 and bumps 103 composed of the intermetallic compound.

A method of producing the bumps 103 of the intermetallic compound will be described in detail with reference to Table 1 and FIG. 6.

TABLE 1

| PROCESS CONDITIONS | | | BUMP SHAPE (AVERAGE) | |
| --- | --- | --- | --- | --- |
| SUBSTRATE TEMPERATURE [K.] | CAST TARGET POWER [mW/mm²] | SPUTTERING TIME [s] | TARGET HEIGHT [nm] | BUMP DENSITY [×10¹²/m²] |
| 500 | 20 | 6 | 10 | 2.9 |
| 500 | 40 | 6 | 20 | 5.2 |
| 500 | 80 | 6 | 45 | 1 |
| 450 | 20 | 6 | 7 | 2.7 |
| 450 | 40 | 6 | 16 | 5 |

TABLE 1-continued

| PROCESS CONDITIONS | | | BUMP SHAPE (AVERAGE) | |
|---|---|---|---|---|
| SUBSTRATE TEMPERATURE [K.] | CAST TARGET POWER [mW/mm$^2$] | SPUTTERING TIME [s] | TARGET HEIGHT [nm] | BUMP DENSITY [×10$^{12}$/m$^2$] |
| 450 | 80 | 6 | 44 | 1 |
| 400 | 20 | 6 | 5 | 2.5 |
| 400 | 40 | 6 | 12 | 5 |
| 400 | 80 | 6 | 40 | 1.1 |
| 500 | 20 | 12 | 15 | 6.8 |
| 500 | 40 | 12 | 35 | 2 |
| 500 | 80 | 12 | 48 | 0.3 |
| 450 | 20 | 12 | 12 | 5.5 |
| 450 | 40 | 12 | 30 | 1.8 |
| 450 | 80 | 12 | 47 | 0.6 |
| 400 | 20 | 12 | 10 | 5.1 |
| 400 | 40 | 12 | 27 | 1.9 |
| 400 | 80 | 12 | 45 | 0.7 |

Figure 6:
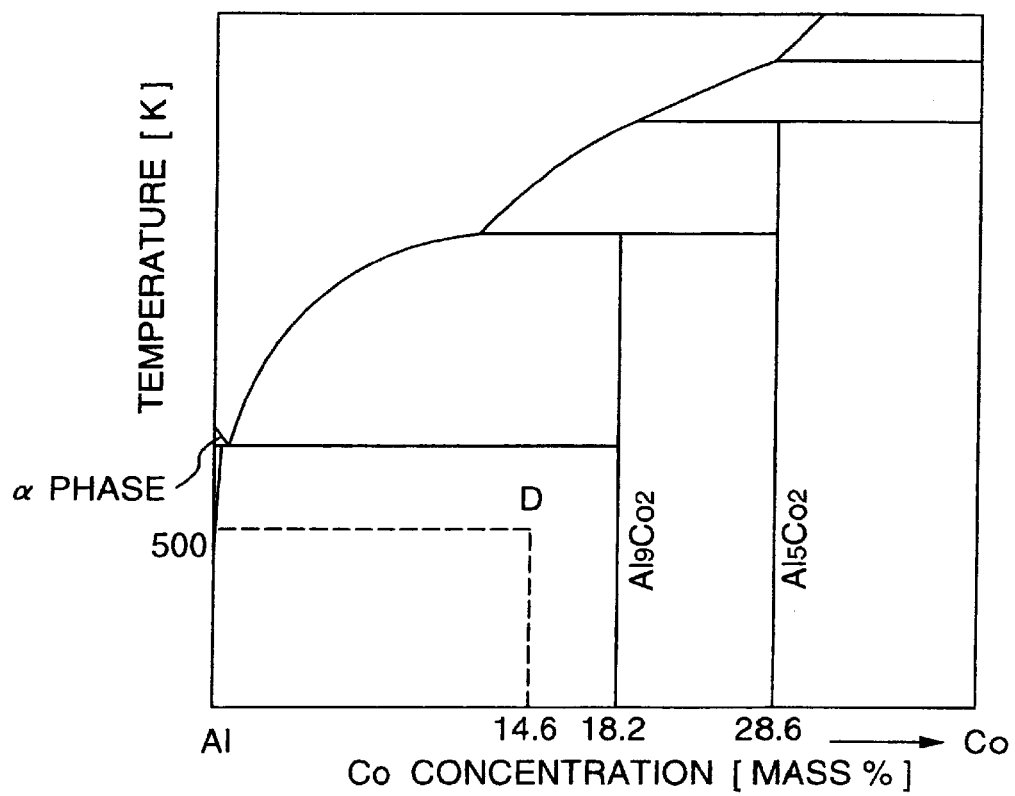
FIG. 6 is an Al—Co phase diagram to which reference is made in explaining the process for generating minute bumps composed of an intermetallic compound.

FIG. 6 shows a part of the Al—Co phase diagram having the intermetallic compound phase. For example, the point D shown in FIG. 6 indicates that when the concentration of atom Co is 14.6 mass % and the temperature is 500K, the solid solution phase α of Al and the intermetallic compound Al$_9$CO$_2$ phase at a ratio of 1:4 exist stably from the energy point of view. Therefore, if the substrate is supplied with a composition of 14 mass % of Co and maintained at the temperature 500K for a long time enough to fully diffuse, the phase α and phase θ can be produced at a ratio of 1:4. If the substrate is supplied with a composition of 18.2 mass % of Co, only the Al$_9$Co$_2$ phase can be produced at a temperature of 500K.

Thus, the target of Al-14.6 mass % Co was sputtered onto the alloy layer 102, producing the bumps 103 composed of the intermetallic compound of Al and Co. This target is produced by uniformly mixing fine powder of Al and Co and sintering the mixture, and thus it contains chiefly an intermetallic compound of Al$_9$Co$_2$, and a uniform mixture of Al and Co. Since the proportion of Co in the target is 14.6 mass %, the contents of the intermetallic compound Al$_9$CO$_2$ and the Al atoms are 80% and the remainder, respectively when the respective atoms are sputtered to reach the substrate and diffuse on the surface of the substrate 101 until the equilibrium (see FIG. 6). In the actual process, the proportion of the contents changes under the process conditions such as substrate temperature and process time. In addition, the target material may be any material without being limited to Al-14.6 mass % Co as long as an intermetallic compound phase is generated in the equilibrium state. Moreover, while the process gas used in the sputtering is argon, it may be any gas if it is an inert gas that does substantially not react with the target material.

Figure 7:
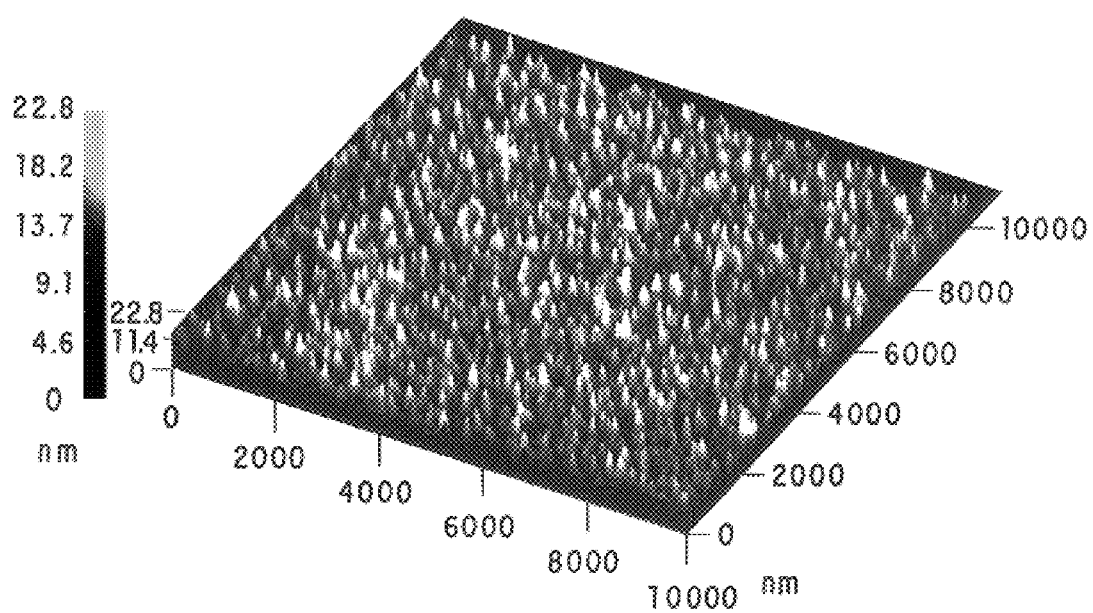
FIG. 7 is a figure showing an AFM image in the case when bumps are formed by use of Al-14.6% Co target.

The surface shape of the substrate 101, which has the alloy layer 102 and the bumps 103 formed to be composed of the intermetallic compound of Al and Co, was observed by an Atomic Force Microscope (AFM). FIG. 7 shows the reconstituted figure. The microscope used for the observation was of, for example, NV3000 type made by Olympus Optical Co., Ltd. of Japan. The size of one side of the visual field was 10 microns. The bump density within this area was 5.1×10$^{12}$/m$^2$, and the average bump height was 10 nm. The bump density and bump height can be controlled by changing the process conditions as shown in Table 1. Under the same cast target power and sputtering time, the atoms are more easily diffused as the substrate temperature increases, and thus the bump height increases. Moreover, in order to increase the bump density, it is necessary to increase the cast target power or sputtering time. If it is excessively increased, the bumps themselves become large in diameter, and united to produce huge bumps, resulting in a small number of bumps. Finally, the surface becomes substantially flat.

Figure 8:
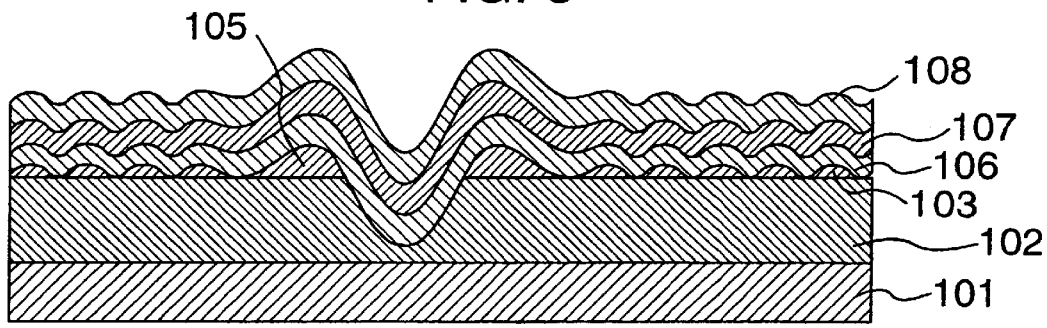
FIG. 8 is a cross-sectional diagram of a magnetic recording medium as the embodiment 1 of the invention.
Figure 9:
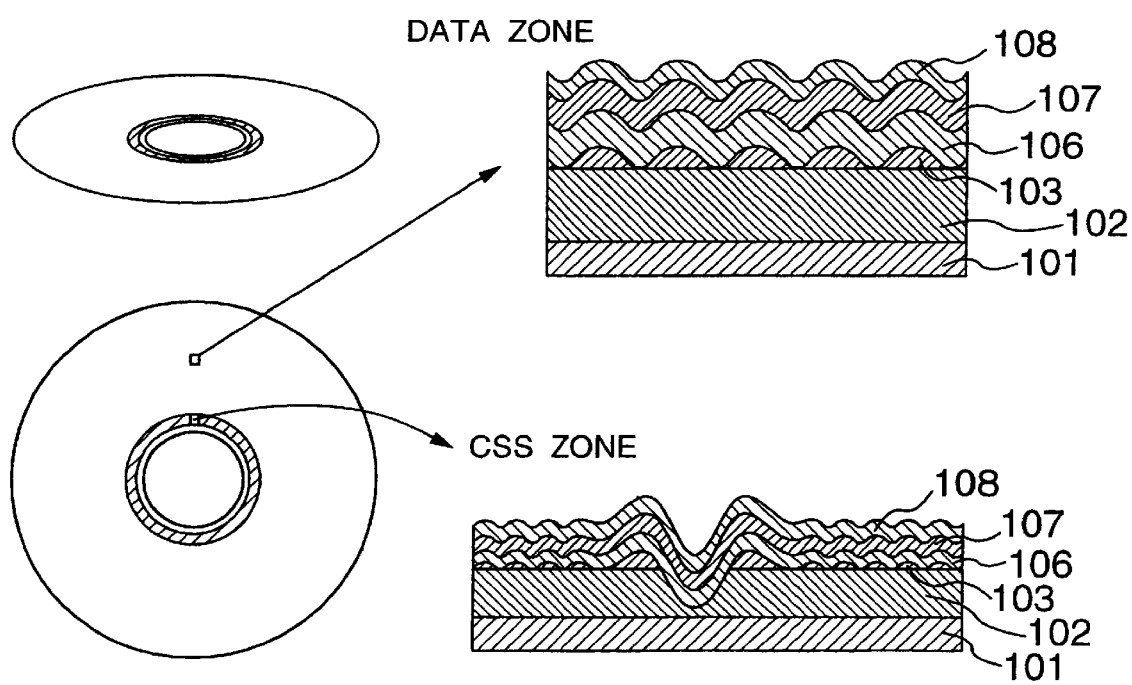
FIG. 9 is a schematic diagram showing the magnetic recording medium as the embodiment 1 of the invention.

A process for producing ring-type bumps by laser will be described with reference to Table 2 and FIG. 8. The CSS zone on the substrate 101 with the bumps 103 composed of the intermetallic compound of Al and Co was processed by laser beam to form discrete ring-type bumps 105. The cast laser power was, for example, 600 mW, which was reduced by an ND filter to a range of 1/10 to 1/4 and used. The laser used was, for example, the Q switch-type pulse laser V70 of wavelength 1064 nm made by Spectra Physics Inc. of USA. The CSS zone was processed over all the circumference by the laser. In this embodiment, the CSS zone was, for example, in the range of 17.3 to 20.5 mm in radius from the center. This range can be arbitrarily set by those skilful in the art. The laser beam does substantially not affect the other regions than the irradiated area, and thus the shape of the bumps 103 composed of the intermetallic compound can be kept. As a result, the CSS zone had the bumps 103 of the intermetallic compound and the ring-type bumps 105 formed by laser in a mixed state, and the other region had only the bumps 103 of the intermetallic compound. FIG. 9 shows these regions in a model form. In addition, the distance between the discrete ring-type bumps 105 can be varied and fixed in the circumferential direction and radius direction of the substrate 101, independently by changing the substrate holder carrying speed and substrate rotation rate. The height of the ring-type bumps 105 can also be varied by changing the material quality and film thickness of the alloy film 102 and the Q-switch frequency and power of the laser. Table 2 shows the variables.

TABLE 2

| MATERIAL SYSTEM | FILM THICKNESS (mm) | LASER POWER (mW) | Q-SWITCH FREQUENCY (kHz) | BUMP HIGHT (nm) |
|---|---|---|---|---|
| Co-Cr30Ta8 | 25 | 60 | 40 | 9 |
| | 50 | 60 | 40 | 7 |
| | 100 | 60 | 30 | 19 |
| | 100 | 60 | 32 | 15 |
| | 100 | 60 | 34 | 12 |
| | 100 | 60 | 40 | 5 |
| | 200 | 60 | 16 | 25 |
| | 200 | 60 | 32 | 14 |
| | 200 | 60 | 34 | 12 |

TABLE 2-continued

| MATERIAL SYSTEM | FILM THICKNESS (mm) | LASER POWER (mW) | Q-SWITCH FREQUENCY (kHz) | BUMP HIGHT (nm) |
|---|---|---|---|---|
| | 200 | 60 | 40 | 5 |
| | 200 | 150 | 64 | 22 |
| Cr-Si15 | 100 | 60 | 32 | 17 |
| | 200 | 60 | 32 | 14 |
| Cr-Ti15 | 100 | 60 | 32 | 15 |
| | 200 | 60 | 32 | 13 |
| Cr-Ti20 | 100 | 60 | 32 | 15 |
| | 200 | 60 | 32 | 12 |
| Cr-V20 | 100 | 60 | 32 | 14 |
| | 200 | 60 | 32 | 13 |
| NiTi | 25 | 60 | 40 | 14 |
| | 50 | 60 | 40 | 12 |
| | 100 | 60 | 36 | 18 |
| | 200 | 60 | 36 | 17 |
| NiAl | 100 | 60 | 32 | 18 |
| | 200 | 60 | 32 | 16 |
| Co-Cr30Zr10 | 25 | 60 | 40 | 10 |
| | 50 | 60 | 40 | 7 |
| | 100 | 60 | 32 | 17 |
| | 200 | 60 | 32 | 15 | that the substrate be kept under a pressure of $2.0 \times 10^{-5}$ Pa because of preventing it from oxidation while the alloy layer 106, magnetic recording layer 107 and protective film layer 108 are being grown to form. Moreover, we examined the slide reliability of the magnetic recording medium (bump density: $5.1 \times 10^{12}/m^2$, the average bump height: 10 nm) of which the protecting film layer 108 has further formed thereon a 3-nm thick lubricant film chiefly containing perfluoropolyether. The slide test was conducted by use of the thin film magnetic head that was well known by those skilful in the art. We first made the CSS endurance test on the CSS zone of the substrate located 19 mm in radius, and stickiness measurement on the data zone of the substrate located 30 mm in radius. The results were listed in Table 3 together with an example 9 for comparison which was produced with no bumps 103 and ring-type bumps 105 composed of intermetallic compound but with the others formed under the same conditions.

TABLE 3

| | MINUTE BUMPS 103 | | | RING-TYPE BUMPS 105 | | | |
|---|---|---|---|---|---|---|---|
| | Co | | | | | | |
| | CONCEN-TRATION (MASS %) | BUMP DENSITY ($\times 10^{12}/m^2$) | BUMP HEIGHT (nm) | BUMP DISTANCE PERIPHERAL × RADIUS (μm) | BUMP HEIGHT (nm) | CSS (R-19 mm) (mN) | STICK (R-30 mm) (mN) |
| EMBODIMENT 1 | 14.6 | 5.1 | 10 | 30 × 30 | 15 | 10 | 8.5 |
| COMPARATIVE EXAMPLE 1 | 14.6 | 5.1 | 10 | 30 × 30 | 10 | 15 | 8.4 |
| COMPARATIVE EXAMPLE 2 | 14.6 | 5.1 | 10 | 50 × 20 | 15 | 17 | 8.4 |
| COMPARATIVE EXAMPLE 3 | 14.6 | 5.1 | 10 | 10 × 10 | 15 | 9 | 8.6 |
| COMPARATIVE EXAMPLE 4 | 14.6 | 5.1 | 10 | 50 × 20 | 10 | 20 | 8.8 |
| COMPARATIVE EXAMPLE 5 | 14.6 | 5.1 | 10 | 10 × 10 | 10 | 12 | 8.3 |
| COMPARATIVE EXAMPLE 6 | 0 | | | 30 × 30 | 15 | 11 | 18 |
| COMPARATIVE EXAMPLE 7 | 7.3 | 7.7 | 5 | 30 × 30 | 15 | 12 | 12 |
| COMPARATIVE EXAMPLE 8 | 10.9 | 6.8 | 12 | 30 × 30 | 15 | 10 | 10 |
| COMPARATIVE EXAMPLE 9 | — | — | — | — | — | CRASHED | 20 |

The height of the ring-type bumps 105 was optically measured by the apparatus called MICRO XAM made by Phase Shift Technology Inc. of USA, and observed by AFM as the need arises. The size of one side of the visual field was 10 microns. In this embodiment, on a ternary alloy of, for example, Co—Cr$_{30}$Ta$_8$ formed 100 nm thick, there were further deposited, after the substrate was rinsed, an alloy layer 106, a magnetic recording layer 107 and a protective film layer 108. The apparatus used in this embodiment was, for example, MDP250 made by INTEVAC Inc. of USA. This apparatus was an in-line sputtering apparatus having a substrate heating chamber, a substrate cooling chamber and a plurality of substrate processing chambers capable of magnetron sputtering. Any apparatus may be used if it can control the substrate temperature and sputtering. It is desired It will be understood that the magnetic recording medium of this embodiment is more excellent in its slide reliability than the medium without bumps (comparative example 9).

A description will be made of the results of comparing this embodiment with examples with the surface shape changed. There are eight other different examples for comparison as listed above. Of these examples, the five different examples (comparative examples 1–5) have the ring-type bumps 105 changed in their height and spacings. The remaining three examples (comparative examples 6–8) have bumps 103 of intermetallic compound grown with the Co concentration of Al—Co target being varied as 0, 7.3, and 10.9%. The conditions are listed on Table 3.

Figure 1:
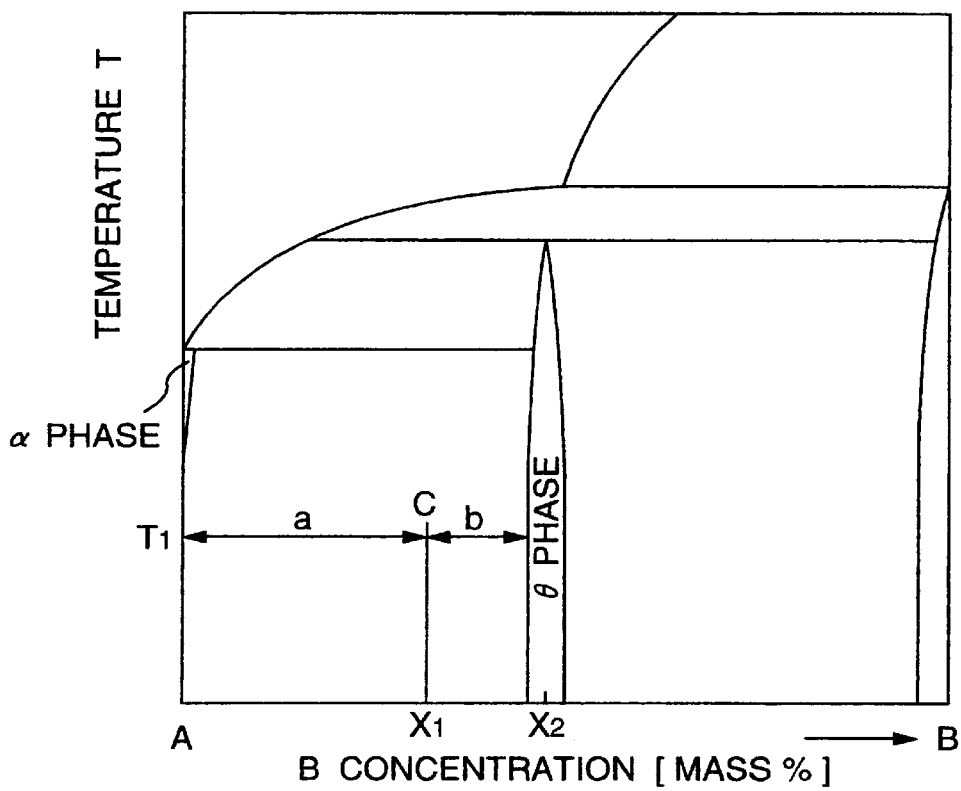
FIG. 1 is a phase diagram to which reference is made in explaining the process for generating minute bumps composed of an intermetallic compound.
Figure 2:
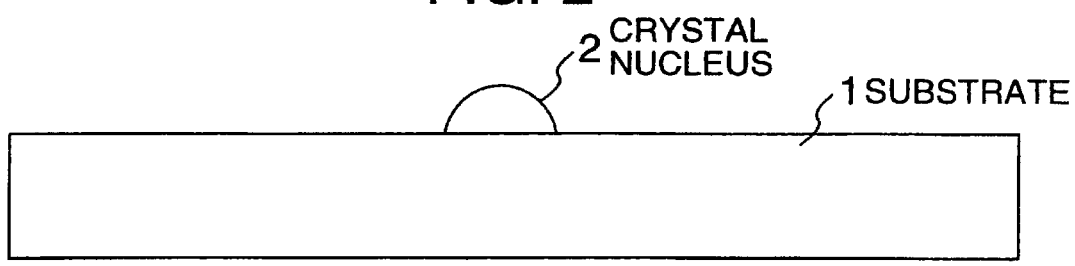
FIG. 2 is a diagram to which reference is made in explaining the process for generating minute bumps composed of an intermetallic compound.
Figure 3:
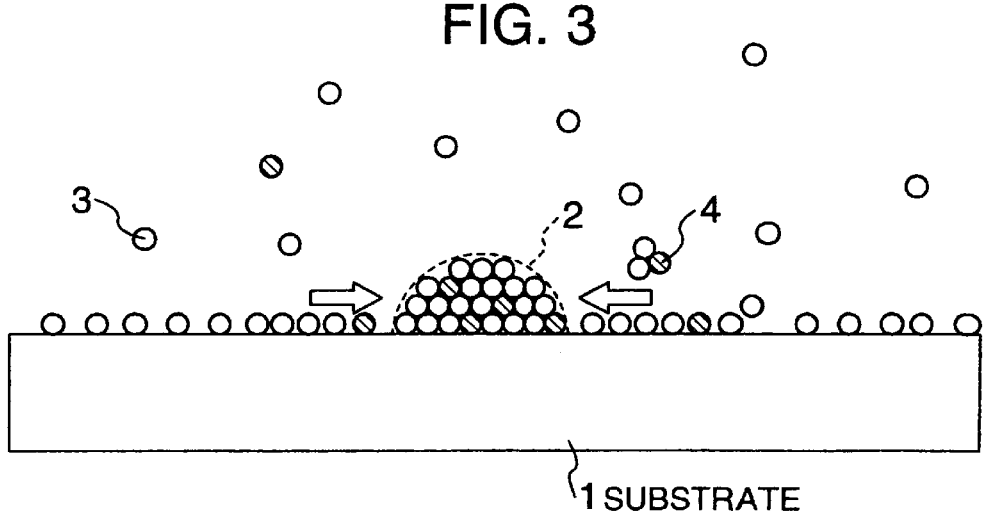
FIG. 3 is a diagram to which reference is made in explaining the process for generating minute bumps composed of an intermetallic compound.
Figure 4:
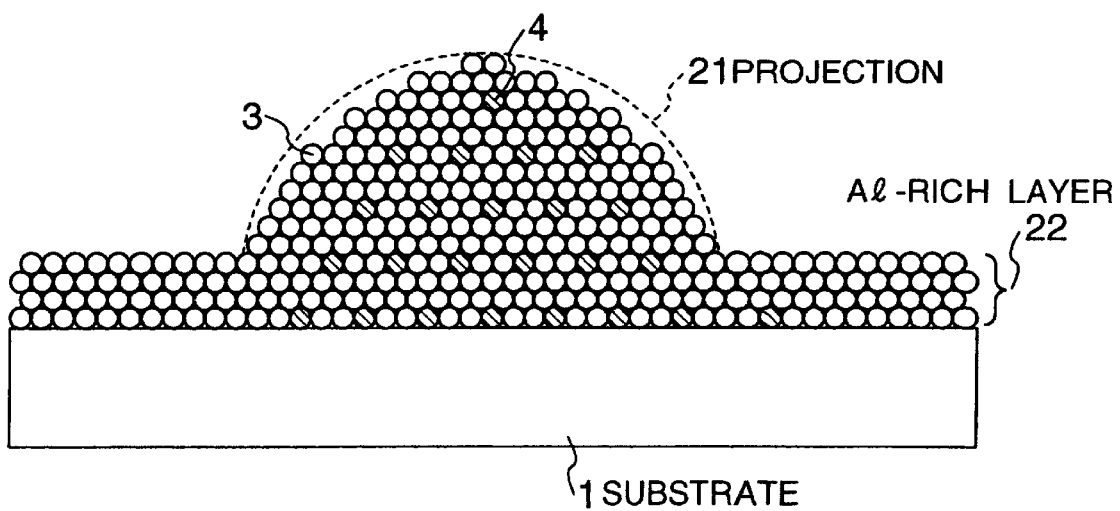
FIG. 4 is a diagram to which reference is made in explaining the process for generating minute bumps composed of an intermetallic compound.
Figure 10:
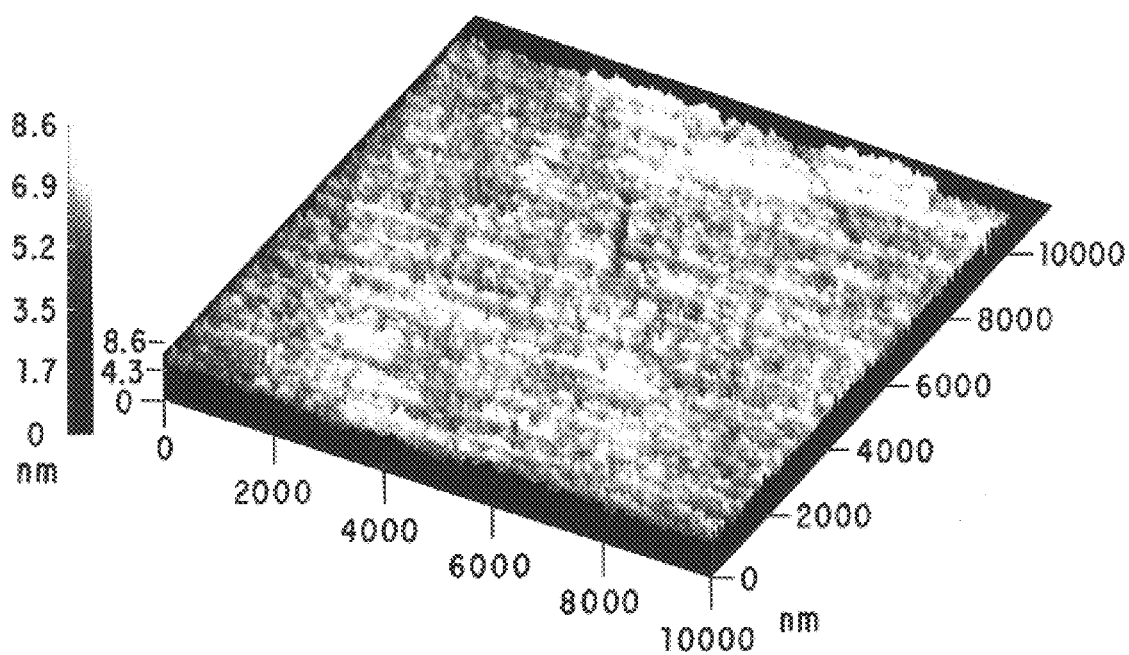
FIG. 10 is a figure showing the AFM image on the surface of a magnetic recording medium as an example for comparison.
Figure 11:
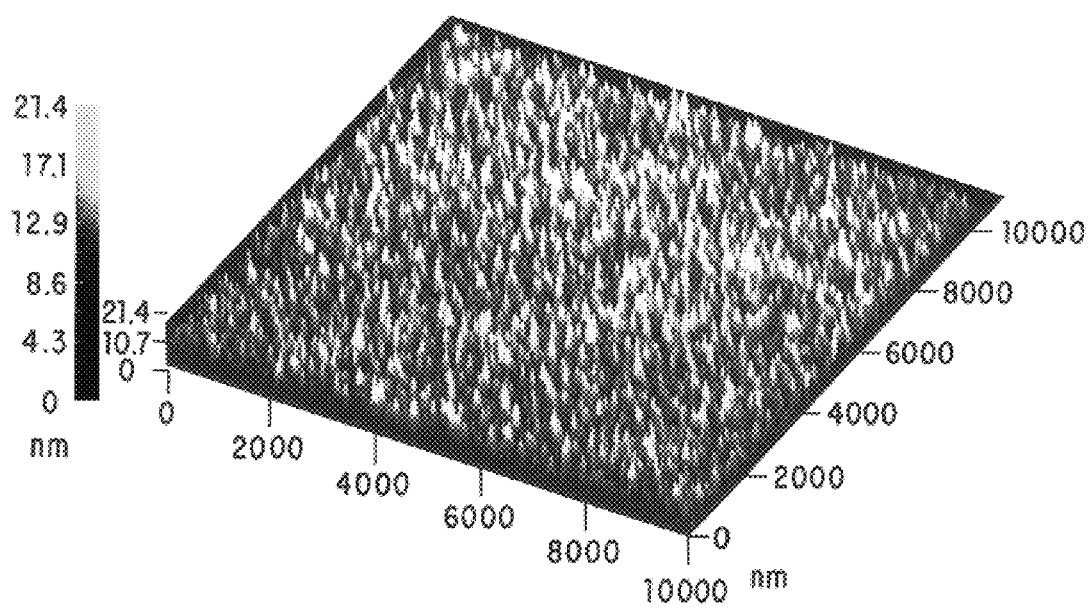
FIG. 11 is a figure of the AFM image in the case when bumps are formed by use of Al-7.1% Co target.
Figure 12:
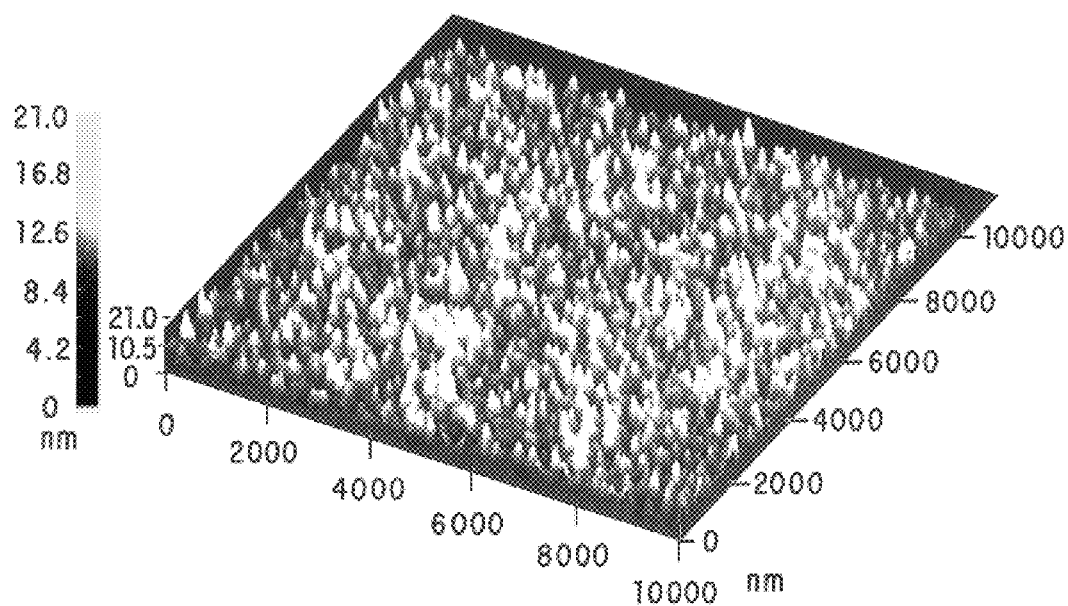
FIG. 12 is a figure of the AFM image in the case when bumps are formed by use of Al-10.9% Co target.

The other conditions are the same as in the above embodiment. The surface shapes of the magnetic recording media according to the examples 6, 7 and 8 with the ring-type bumps 105 formed were observed by AFM. The measurement was made at the point, R=30 mm on the substrate from the center. In addition, CSS test was conducted at the point, R=19 mm on the substrates of all comparative examples, and stickiness was measured at the point, R=30 mm. A description will be first made of the surface shape of the magnetic recording media at the place of radius R=30 mm where only the bumps 103 of intermetallic compound are formed. Since no intermetallic compound for bumps is produced when the concentration of Co is zero, or when only Al is used, the surface is substantially flat as shown by the AFM image in FIG. 10. FIG. 11 shows the AFM image of the surface with the 7.3 mass % of Co concentration, and FIG. 12 the AFM image of the surface with 10.9 mass %. When the concentration of Co is 7.3 mass %, excessive Al is more than the intermetallic compound of which the bumps are composed. The thickness of the Al-rich layer in FIG. 4 is large, and the bumps are not clear because the valleys between the bumps are filled by Al, but the bumps themselves are formed. Since an intermetallic compound $Al_5Co_2$ of bumps can be grown from the Al—Co system, the optimum concentration of Co is in the range from 7 mass % to 29 mass %. Similarly, the optimum concentrations of Cr, Mo(V) and W of systems Al—Cr, Al—Mo, Al—W, and Al—V are 5–20 mass %, 3–25 mass % and 3–20 mass %, respectively. Although there is a composition containing 40% or above of intermetallic compound even when each element is out of the above range of mass %, the diffusion at a low temperature (600 K or below) does not easily occur, and thus the above ranges of concentration are still preferable. However, when only the bump is grown, the substrate can be maintained at a higher temperature than 600 K during the process. In that case, an intended object can be achieved by using a target of which the minority atom-X concentration is in the range from 0.4 to 1 time as high as the minority atom-X concentration of the intermetallic compound. Moreover, the results of the CSS test and tackiness measurement will be described with reference to Table 3. The results of the CSS test show the stickiness of the medium that was one hour left after the CSS test was made 50000 times. The media with wide bump spacings have slightly large stickiness, and have a clear effect as compared with the example 9 in which no bumps are provided. The comparative examples other than examples 6 and 9 have large effect on the stickiness at R=30 mm as compared with the examples 6 and 9 in which substantially no bumps are provided. It will be understood that, in order to reduce the stickiness, it is necessary for the bumps 103 of intermetallic compound to have an average height of 5 nm or above.

Embodiment 2

Figure 13:
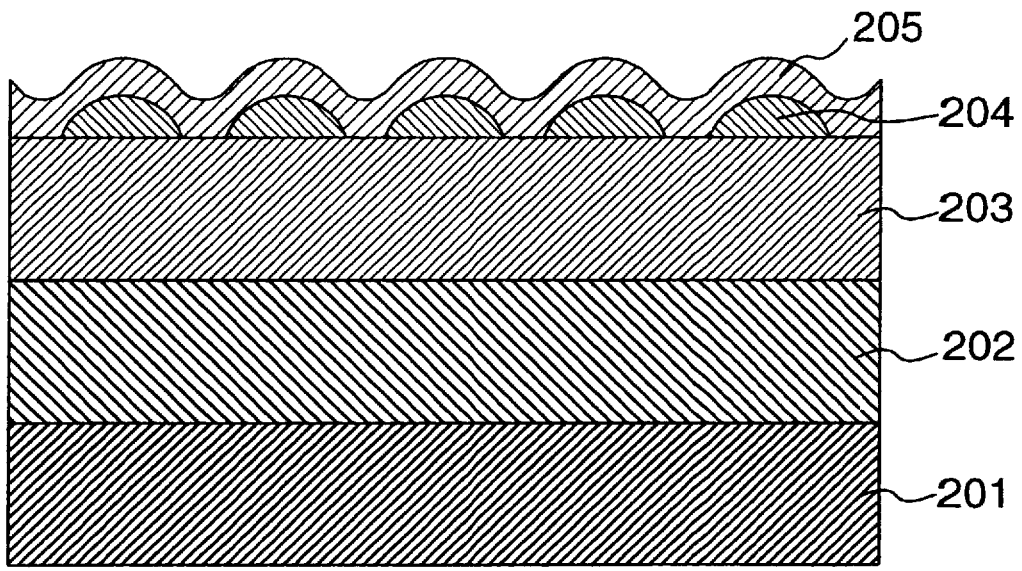
FIG. 13 is a diagram showing another embodiment 2 of the invention in which minute bumps composed of an intermetallic compound are formed.
Figure 15:
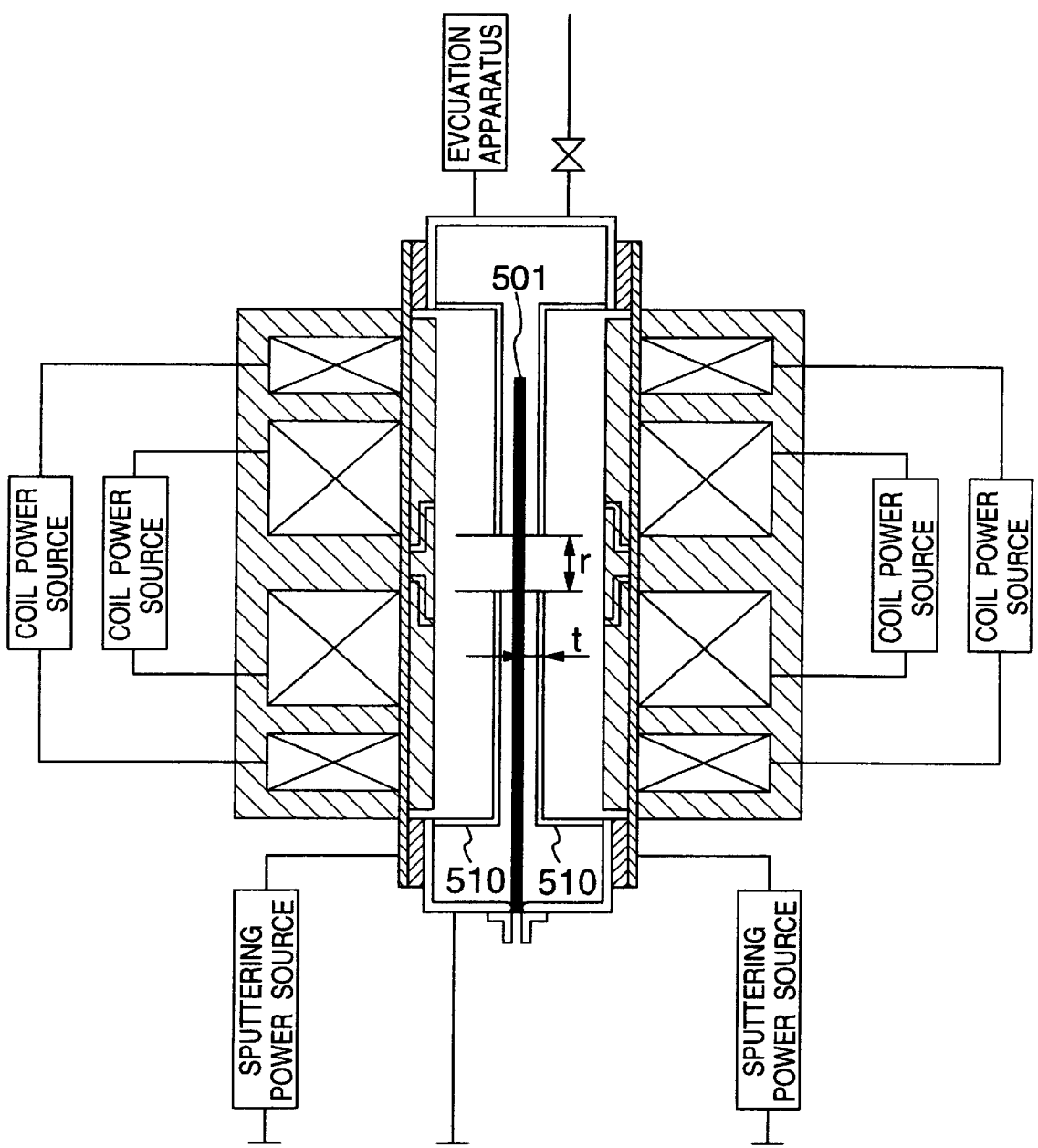
FIG. 15 is a schematic diagram of the apparatus for producing the minute bumps.

The second embodiment of the invention will be described with reference to drawings. FIG. 13 is a cross-sectional diagram of a magnetic recording medium of this embodiment, in which bumps of intermetallic compound are formed on an Al alloy substrate. A disk-like Al alloy substrate 201 plated with an alloy of Ni and P, which substrate is, for example, 95 mm in outer diameter, 25 mm in inner diameter, and 0.8 mm in thickness, and has a concentric aperture provided at the center, is heated in vacuum by a lamp in order to degas and improve the magnetic recording characteristics. The electric power cast at this time is controlled to keep such a temperature that an alloy layer 203 to be formed later can have a certain magnetic characteristic. Then, an alloy layer 202 of chromium (abbreviated Cr) and titanium (abbreviated Ti) is deposited on the substrate 201, and the alloy layer 203 of cobalt (abbreviated Co), Cr and platinum (abbreviated Pt) is grown on the alloy layer 202. The alloy layer 203 has a function to magnetically record. The alloy layer 202 of Cr and Ti has the effect that it can help the alloy layer 203 be made well stick to the substrate 201, and the crystal particle size and crystal orientation of the alloy layer 203 be well controlled. The materials of which the alloy layer 202 of Cr and Ti and the alloy layer 203 of Co, Cr and Pt are made may be other materials if they can provide the above-given function and effect. The material of the substrate 201 may also any other material if it is non-ferromagnetic and has satisfactory flatness and toughness. Thereafter, the substrate 201 with the alloys formed is treated for a predetermined time in a processing chamber that has a helium introducing mechanism, and the substrate 201 is cooled to a substrate temperature suited for growing bumps 204 of an intermetallic compound of Al and Cr. This cooling process will not be necessary provided that the substrate temperature can be reduced to the predetermined temperature by radiation and conduction while the substrate is carried from a processing chamber to another. The gas to be used may be any gas if the cooling effect can be obtained. If the substrate temperature is too low, the substrate is again heated to the predetermined temperature. Then, the bumps 204 of the intermetallic compound of Al and Cr are grown on the alloy layer 203 by sputtering a target of Al-10 Mass % Cr. In this case, a shield is provided at the outer periphery of the substrate 201, controlling the bumps 204 to be suppressed from growing. FIG. 15 schematically shows the positional relation among the sputtering target, the shield 210 and the substrate 201 in the vacuum processing chamber. The change of the bump height and bump density at the positions of the CSS zone and the data zone can be controlled by varying the distance t between the shield 210 and the substrate 201 and the diameter r of the aperture of the shield 210. Table 4 shows the bump heights at the positions of CSS zone (located at radius R=19 nm on the substrate) and data zone (located at radius R=30 nm on the substrate) with respect to the distance t between the shield 210 and the substrate 201 and the diameter r of the aperture of the shield 210.

TABLE 4

| t (mm) | r (mm) | BUMP HEIGHT AT R = 19 mm (nm) | BUMP HEIGHT AT R = 30 mm (nm) |
| --- | --- | --- | --- |
| 5 | 40 | 20 | 3 |
| 10 | 40 | 18 | 4 |
| 15 | 40 | 15 | 7 |
| 20 | 40 | 15 | 9 |
| 5 | 60 | 25 | 8 |
| 10 | 60 | 20 | 10 |
| 15 | 60 | 18 | 11 |
| 20 | 60 | 17 | 13 |

Figure 14:
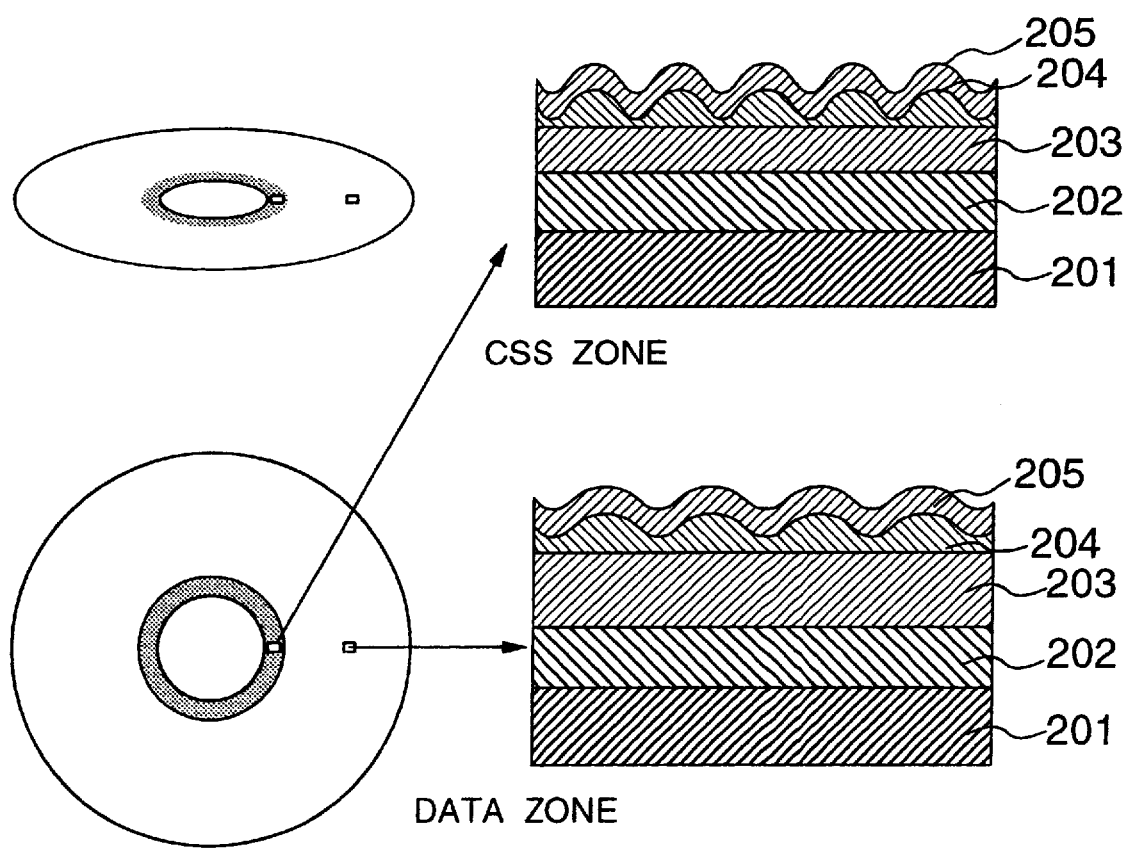
FIG. 14 is a schematic diagram of the magnetic recording medium as the embodiment 2 of the invention.

Thus, the bumps 204 on the outer periphery of the substrate 201 can be grown to have a lower density and average height than those on the inner periphery. In addition, the bumps on the inner periphery can be grown to have a proper bump height and density for the CSS, and also a desired floating height margin can be achieved on the data recording region. FIG. 14 schematically shows the cross-sections on those zones. Of course, if the positions of the zones are changed, the location of the shield must be altered. While this embodiment used the in-line sputtering apparatus MDP1100, which was made by Varian Inc. of USA and had a substrate heating chamber, a substrate cooling chamber and a plurality of substrate chambers capable of magnetron sputtering, any apparatus may be used if the substrate temperature control and sputtering can be made. In addition, it is desired that in order to be prevented from oxidation the substrate be kept under a pressure of 2.0×10$^{-5}$ Pa or below during the processes for growing the alloy layer of Cr and Ti, alloy layer 203 of Co, Cr and Pt, bumps 204 of intermetallic compound, and protective film layer 205. Thereafter, the protective film layer 205 is deposited over the substrate in order to protect the alloy layer 203 and bumps 204 of intermetallic compound from mechanical and chemical contact, constituting the structure shown in FIG. 13. Table 5 shows the results of the measurement of stickiness at radius R=30 mm and the CSS test at R=19 mm on the structure of FIG. 13 under the same conditions as in the embodiment 1.

less laser power. We considered, as the materials for those layers, an alloy of Cr and silicon (abbreviated Si), an alloy of Cr and titanium (abbreviated Ti), an alloy of Cr and vanadium (abbreviated V), an alloy of nickel (abbreviated Ni) and Ti, an alloy of Ni and Al, and a ternary alloy of Co, Cr and zirconium (Zr). These materials are different in their physical characteristics such as absorption efficiency and thermal conductivity to laser. The process conditions which can be set in both the process for depositing thin films and the process for working by laser are often limited by the manufacturing apparatus side. Thus, for the actual manufacture it is advantageous to consider various different process parameters. The alloy layer 1103 on the thin film 1102 has a function to form bumps when irradiated by pulse

TABLE 5

|  | MINUTE BUMPS 204 | | | | | |
| --- | --- | --- | --- | --- | --- | --- |
| Cr CONCEN- TRATION (MASS %) | BUMP DENSITY (R-19) (×10$^{12}$/m$^2$) | BUMP HEIGHT (R-19) (nm) | BUMP DENSITY (R-30) (10$^{12}$/m$^2$) | BUMP HEIGHT (R-30) (nm) | CSS (R-19 mm) (mN) | STICKINESS (R-30 mm) (mN) |
| EMBODIMENT 2 | 10 | 6.8 | 15 | 4 | 5 | 14 | 10.5 |
| EXAMPLE | 10 | 4.8 | 17 | 2.8 | 6 | 18 | 12.2 |
| EXAMPLE 9 | 0 | — | — | — | — | CRASHED | 20 |

It will be understood that this embodiment has an effect as compared with the substrate with no bumps 204 of intermetallic compound. In Table 5, an additional example is shown in which the bumps 204 of intermetallic compound was deposited on a glass substrate, and then the alloy layer 202, alloy layer 203 of Co, Cr and Pt and the protective layer 205 were formed thereon. It will also be understood that it has an effect as compared with the substrate with no bumps 204 of intermetallic compound.

Embodiment 3

Figure 16:
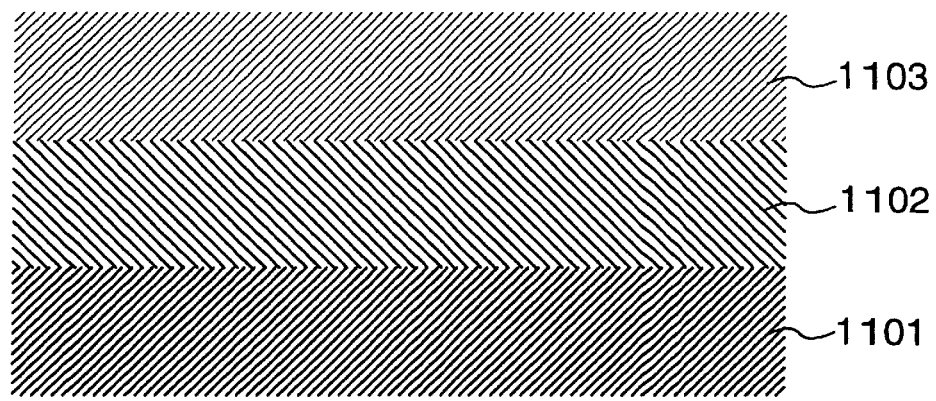
FIG. 16 shows an example of the cross-section of a layered structure on which ring-type bumps are formed by laser.

The third embodiment of the invention will be described with reference to drawings. FIG. 16 is a longitudinal cross-sectional diagram of a thin film structure formed on an Al alloy substrate.

First, a disk-like Al alloy substrate 1101 plated with an alloy of Ni and P, which substrate is, for example, 95 mm in outer diameter, 25 mm in inner diameter, and 0.8 mm in thickness, and has a concentric aperture provided at the center, is heated in vacuum by a lamp in order to degas. The electric power cast at this time is controlled so that the substrate is heated to a high temperature so as not to be deformed. Typically, the substrate temperature is set to a temperature in the range from 100 to 250° C. Then, silicon oxide as a target is sputtered to form a thin film of silicon oxide (SiO$_x$, x≦2) 1102 on the substrate 1101. In this case, the SiO$_x$ thin film 1102 was deposited to have four different thickness values 10, 50, 200 and 800 nm on separate samples of substrate 1102. The thicker the film, the more the thermal conduction can be suppressed. Thereafter, an alloy layer 1103 of, for example, cobalt (abbreviated Co), chromium (abbreviated Cr) and tantalum (abbreviated Ta) is deposited over the substrate 1101. The proportions of Cr and Ta are 30 mass % and 8 mass %, respectively, and this composition provides substantially non-ferromagnetic property. The alloy layer 1103 was formed to have four different thickness values, for example, 25, 50, 100 and 200 nm on separate substrates. The thinner the film, the less the thermal capacity of the whole film, thus the substrate being processed with the laser. The material for the alloy layer 1103 may be any material if it has the above-mentioned function and effect. While the substrate 1101 used is the substrate made by Toyo Kohan (Inc.) of Japan, it may be any material if it is non-ferromagnetic material, and has excellent flatness and strength.

The apparatus used to produce the structure of FIG. 16 is the in-line sputtering apparatus of MDP1100 made by Varian of USA, which has a substrate heating chamber, a substrate cooling chamber and a plurality of substrate processing chambers for magnetron sputtering. It may be any other apparatus if it can make substrate temperature control and sputtering. In addition, it is desired that the substrate be placed under a pressure of 2.0×10$^{-5}$ Pa or less in order to be prevented from oxidation during the processes for growing the layers 1102 and 1103.

Figure 17:
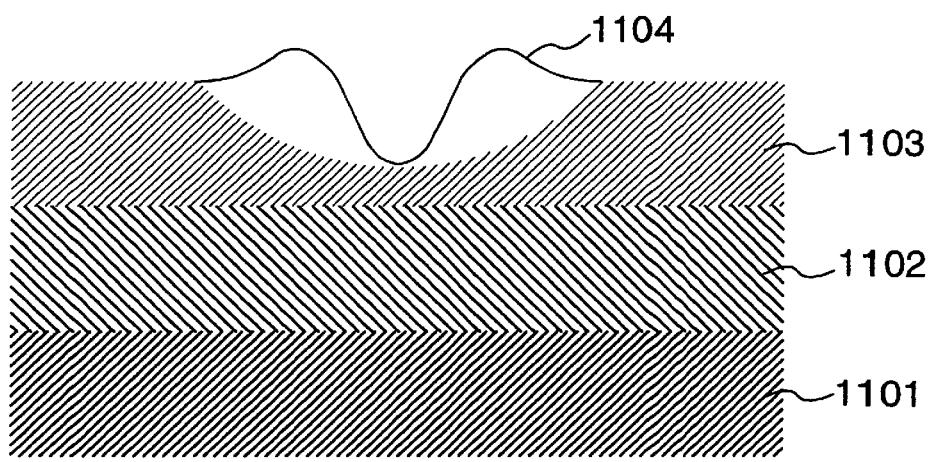
FIG. 17 shows an example of the cross-section of a structure with a ring-type bump formed according to a method of the invention.

A description will be made of a process for producing ring-type bumps by laser with reference to FIG. 17. A desired portion of the substrate 1101 is worked by laser to form discrete ring-type bumps 1104. The cast laser power was 600 mW, which was reduced by an ND filter to a range of ⅒ to ¼ and used. The laser used was, for example, the Q switch-type pulse laser V80 of wavelength 1064 nm made by Spectra Physics Inc. of USA. The CSS zone was processed over all the circumference by the laser. In this embodiment, the CSS zone was, for example, in the range of 18.0 to 20.7 mm in radius from the center. This range can be arbitrarily set by those skilful in the art. The laser beam does substantially not affect the region out of the irradiated range. In addition, the distance between the discrete ring-type bumps 1104 can be varied and fixed in the circumferential direction and radius direction of the substrate, independently by changing the substrate holder carrying speed and substrate rotation rate. The height of the ring-type bumps can also be varied by changing the film thickness of SiO$_x$ and the material quality and film thickness of the alloy film 1103 and the Q-switch frequency and power of the laser. Table 6 shows the relation among those variables. That is, Table 6 shows the relation between the bump height and the film thickness of $SiO_x$. In Table 6, the case in which no film of $SiO_x$ is formed is shown as an example of thickness 0 for comparison. It will be seen that the ring-type bumps 1104 can be formed by less laser power in the presence of $SiO_x$ than in the absence of $SiO_x$. The height of the ring-type bumps 1104 was optically measured by the MICRO XAM apparatus made by Phase Shift Technology Inc. of USA. Since this apparatus was not able to measure the range of 5 nm or below of the height of the bumps with high precision, the corresponding conditions were not shown in Table 6. The process for growing the $SiO_x$ thin film 1102 may be replaced by another process such as chemical vapor deposition (CVD). Moreover, the thin film 1102 of $SiO_x$ may be made of any other material than $SiO_x$ if its thermal conductivity is lower than that of the alloy layer 1103.

Then, the substrate 1101 is processed for a predetermined time in a processing chamber having a helium introducing mechanism, and cooled down to a temperature suited for bumps 1105 of the intermetallic compound of Al and Co to be grown. This process will not be necessary if the substrate temperature can be cooled to the predetermined temperature by radiation and conduction while the substrate is being carried from a processing chamber to another. The gas used may be any gas if it has cooling effect. If the substrate temperature is too low, it is again heated to the predetermined temperature.

In addition, a target of Al and Co is sputtered to form the bumps 1105 of the intermetallic compound of Al and Co on the alloy layer 1103 worked by laser. The process conditions for growing the bumps 1105 will be shown in Tables 7 and 8. Table 7 shows the bump height with or without $SiO_X$ and the slide test results. Table 8 shows the relation between the bump height and the film thickness of $SiN_x$. The bump forming method is the same as that described above with reference to FIGS. 2–4 and 6.

Figure 18:
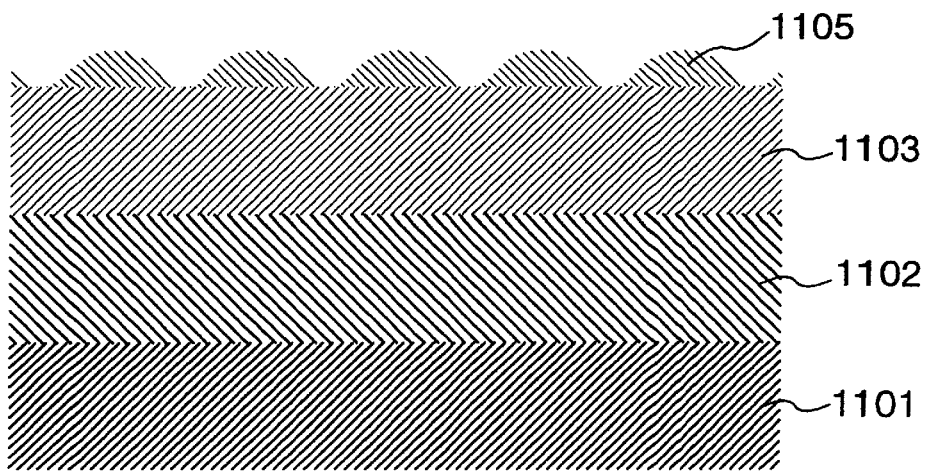
FIG. 18 shows an example of the cross-section of minute bumps formed on the data zone according to the method of the invention.

FIG. 18 shows the structure of the data zone on the substrate 1101 with the fine bumps 1105.

Figure 19:
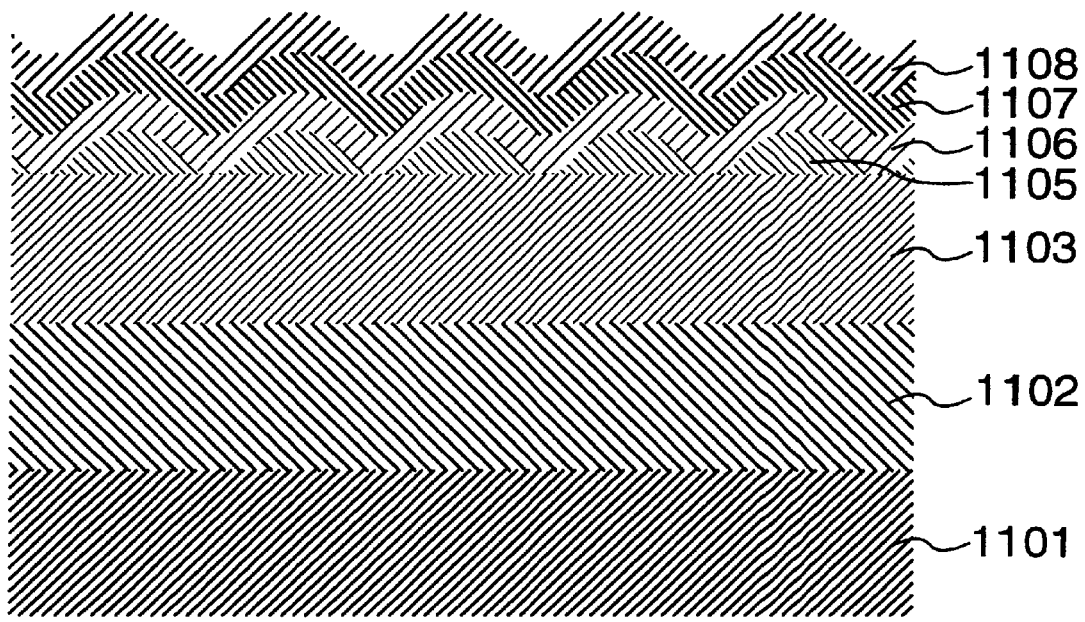
FIG. 19 is a schematic diagram showing an example of a magnetic disk produced according to the method of the invention.

In this embodiment, the substrate with the 800-nm thin film of $SiO_x$ and the 100-nm ternary alloy film of Co—$Cr_{30}Ta_x$ deposited thereon was further worked by laser to form bumps and processed to form bumps of an intermetallic compound. Then, an under layer film 1106, a magnetic recording layer 1107 and a protective film layer 1108 were deposited over the substrate. FIG. 19 schematically shows a cross-section of that structure. As the under layer film 1106, a Cr target was sputtered to form a Cr film of 25 nm in thickness. The process gas used was Ar. The material used for the magnetic recording layer 1107 was a Co alloy containing Cr, Ta and Pt, and sputtered in the atmosphere of Ar to a film thickness of 20 nm. As to the protective film layer 1108, a graphite carbon target was sputtered to form a carbon film. The process gas used was Ar. The thickness of the deposited film was 18 nm. The apparatus by which the structure of FIG. 19 was produced is the MDP250 in-line sputtering apparatus made by the INTEVAC Inc. of USA, having a substrate heating chamber, a substrate cooling chamber and a plurality of substrate processing chambers capable of magnetron sputtering. Any apparatus may be used if it can make substrate temperature control and thin film deposition processing. In addition, it is desired that the substrate be placed under a pressure of $2.0 \times 10^{-5}$ Pa or below in order to be prevented from oxidation during each process for depositing the layers 1106, 1107, 1108. The under layer film 1106 and the magnetic recording layer 1107 are not limited to the above material, thickness and manufacturing process if they can achieve desired magnetic recording characteristics. The protective film layer 1108 is also not limited to the above material, thickness, and manufacturing process if it can attain satisfactory slide reliability. Moreover, we examined the structure of FIG. 19 (the density of the ring-type bumps 1104: $1.1 \times 10^{10}/m^2$, the average bump height: 15 nm, the density of fine bumps 1105: $5.4 \times 10^{12}/m^2$, the average bump height: 10 nm) with a 3-nm lubricant film formed chiefly containing perfluoroether about the slide reliability. The slide reliability test used an MR head known by those skilful in the prior art. First, the CSS endurance test was conducted on the CSS zone at a position of radius 19 mm from the center of the substrate, and secondly stickiness measurement was made on the data zone at a position of radius 30 mm from the center of the substrate. These results are listed on Table 2 together with those of the comparative sample that was produced without any $SiO_x$ thin film 1102, but with the same bump height by controlling the laser power. It will be seen that the slide reliability of the magnetic disk having the $SiO_x$ thin film 1102 shown in this embodiment is substantially equivalent to that of the structure with no $SiO_x$ thin film 1102.

Embodiment 4

The fourth embodiment of the invention will be described with reference to drawings.

Figure 20:
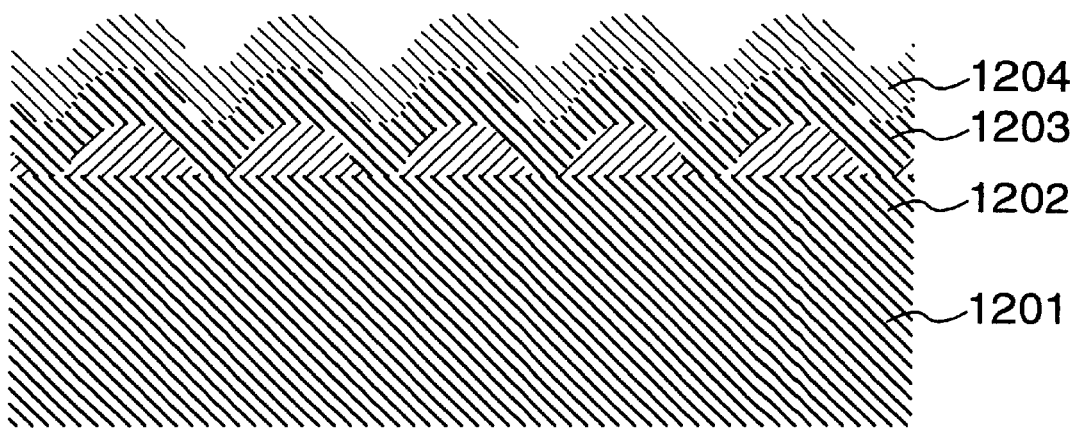
FIG. 20 shows an example of the cross-section of minute bumps formed on the data zone according to the method of the invention.

FIG. 20 shows an example of the thin film structure produced on an Al alloy substrate. First, a disk-like Al alloy substrate 1201 plated with an alloy of Ni and P, which substrate is, for example, 65 mm in outer diameter, 20 mm in inner diameter, and 0.8 mm in thickness, and has a concentric aperture provided at the center, is heated in vacuum by a lamp in order to degas. The electric power cast at this time is controlled so that the substrate is heated to a high temperature so as not to be deformed. Typically, the substrate temperature is set to a temperature in the range from 100 to 250° C. Then, the substrate 1201 is processed for a predetermined time in a chamber having a helium introducing mechanism, and cooled to a predetermined temperature suited to grow the bumps 1202 of the intermetallic compound of Al and Cr. This process will not be necessary if the substrate temperature is reduced to the predetermined temperature by radiation and conduction while it is being carried from a processing chamber to another. The gas to be used may any gas if it has cooling effect. On the contrary, if the substrate temperature is too low, it is again heated.

Then, the bumps 1202 of the intermetallic compound of Al and Cr are deposited on the substrate 1201 by sputtering a target of Al and Cr. In addition, a garget of silicon is reactively sputtered on the substrate 1201 in the atmosphere of sputtering gas containing nitrogen to form a silicon nitride ($SiN_x$, $x \leq 1.33$) thin film 1203. The $SiN_x$ thin film 1203 was formed to have three different thickness values 10, 100 and 800 nm on separate substrates equivalent to the substrate 1201. The thicker the film, the more the thermal conduction can be suppressed. Thereafter, an alloy layer 1204 of Co, Cr and Ta same as the embodiment 1 is deposited over the substrate 1201. The proportions of Cr and Ta are 30 mass % and 8 mass %, respectively, and this composition provides substantially non-ferromagnetic property. The alloy layer 1104 was formed to have four different thickness values, for example, 25, 50, 100 and 200 nm on separate substrates. The thinner the film, the less the thermal capacity of the whole film, thus the substrate being processed with the less laser power. We considered, as the materials for those layers, an alloy of Ni and Ti, and a ternary alloy of Co, Cr and Zr.

The apparatus used to produce the structure of FIG. 20 is the in-line sputtering apparatus of MDP1100 made by Varian Inc. of USA, which has a substrate heating chamber, a substrate cooling chamber and a plurality of substrate processing chambers capable of magnetron sputtering. If the substrate temperature control and sputtering can be made, any apparatus may be used. It is desired that the substrate be kept under a pressure of $2.0 \times 10^{-5}$ Pa or below in order to be prevented from oxidation during the processes for growing the layers 1202, 1203 and 1204.

The alloy layer 1204 on the substrate 1201 has the function to form bumps when irradiated with pulse laser. The material used for the alloy layer 1204 may be any other material if it has the above function and effect. While the substrate 1201 used is the substrate made by Toyo Kohan (Inc.) of Japan, any material may be used if it is non-ferromagnetic and has satisfactory flatness and strength.

A description will be made of a process for producing ring-type bumps by laser with reference to FIG. 21. A desired portion of the substrate 1201 is worked by laser beam to form discrete ring-type bumps 1205. The cast laser power was 600 mW, which was reduced by an optical attenuation filter to a range of 1/10 to 1/4 and used. The laser used was, for example, the Q switch-type pulse laser V80 of wavelength 1064 nm made by Spectra Physics Inc. of USA. The CSS zone was processed over all the circumference by the laser. In this embodiment, the CSS zone was, for example, in the range of 13.5 to 15.1 mm in radius from the center. This range can be arbitrarily set by those skilful in the art. The laser beam does substantially not affect the region out of the irradiated range. In addition, the distance between the discrete ring-type bumps 1205 can be varied and fixed in the circumferential direction and radius direction of the substrate, independently by changing the substrate holder carrying speed and substrate rotation rate. The height of the ring-type bumps can also be varied by changing the film thickness of SiN and the material quality and film thickness of the alloy film 1204 and the Q-switch frequency and power of the laser. Table 7 shows the relation among those variables. In Table 7, the case in which no film of $SiO_x$ is formed is shown as an example of thickness 0 for comparison. It will be seen that the ring-type bumps 1205 can be formed by less laser power in the presence of $SiN_x$ than in the absence of $SiN_x$. The height of the ring-type bumps 1205 was optically measured by the MICRO XAM apparatus made by Phase Shift Technology Inc. of USA. Since this apparatus was not able to measure the range of 5 nm or below of the height of the bumps with high precision, the corresponding conditions were not shown in Table 7. It will be seen that the ring-type bumps 1205 can be formed by less laser power in the presence of $SiN_x$ than in the absence of $SiN_x$. The process for growing the $SiN_x$ thin film 1203 may be replaced by another process such as chemical vapor deposition (CVD). Moreover, the thin film 1203 of $SiN_x$ may be made of any other material than $SiN_x$ if its thermal conductivity is lower than that of the alloy layer 1204.

Figure 21:
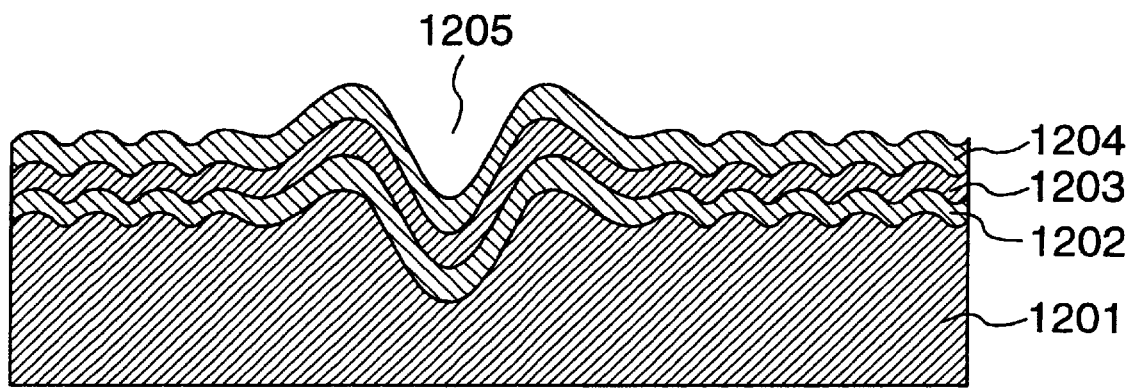
FIG. 21 shows an example of the cross-section of a ring-type bump formed on the CSS zone according to the method of the invention.

In addition, a magnetic recording layer and protective layer can be laminated on the substrate of the structure shown in FIG. 21, thus easily constituting a magnetic disk that is excellent in the slide resistance.

The process for producing the bumps 1202 is the same as in the embodiment 3. The target used in the embodiment 4 is Al-7.6 mass % Cr. This target is produced by uniformly mixing fine powder of Al and Co and sintering the mixture, and thus it contains chiefly an intermetallic compound of $Al_7Cr$, and a uniform mixture of Al and Cr.

Figure 22:
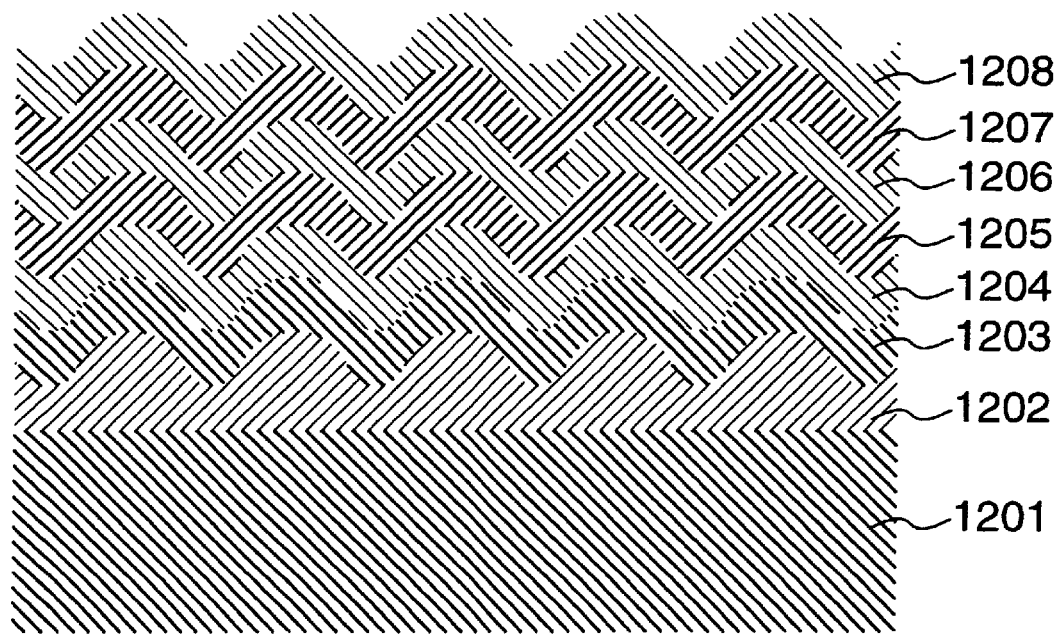
FIG. 22 is a schematic diagram showing an example of a magnetic disk produced according to the method of the invention.

In this embodiment, the substrate with the 100-nm ternary alloy film of Co—$Cr_{30}Ta_8$ deposited thereon was further rinsed, and then an under layer film 1206, a magnetic recording layer 1207 and a protective film layer 1208 were deposited over the substrate. FIG. 22 schematically shows a cross-section of that structure. As the under layer film 1206, a $CrTi_{20}$ target was sputtered to form a CrTi film of 25 nm in thickness. The process gas used was Ar. The material used for the magnetic recording layer 1207 was a Co alloy containing Cr and Pt, and sputtered in the atmosphere of Ar to a film thickness of 22 nm. As to the protective film layer 1208, a carbon film containing nitrogen in the structure was formed by reactive sputtering. The process gas used was Ar-20% $N_2$ and the target was graphite carbon. The thickness of the deposited film was 15 nm. The apparatus by which the structure of FIG. 22 was produced is the MDP250 in-line sputtering apparatus made by the INTEVAC Inc. of USA, having a substrate heating chamber, a substrate cooling chamber and a plurality of substrate processing chambers capable of magnetron sputtering. Any apparatus may be used if it can make substrate temperature control and sputtering. In addition, it is desired that the substrate be placed under a pressure of $2.0 \times 10^{-5}$ Pa or below in order to be prevented from oxidation during each process for depositing the layers 1206, 1207, 1208. The under layer film 1206 and the magnetic recording layer 1207 are not limited to the above material, thickness and manufacturing process if they can achieve desired magnetic recording characteristics. The protective film layer 1208 is also not limited to the above material, thickness, and manufacturing process if it can attain satisfactory slide reliability. Moreover, we examined the structure of FIG. 22 (the density of the ring-type bumps 104: $1.1 \times 10^{10}/m^2$, the average bump height: 15 nm, the density of fine bumps: $5.5 \times 10^{12}/m^2$, the average bump height: 11 nm) with a 3-nm lubricant film formed chiefly containing perfluoroether about the slide reliability. The slide reliability test used an MR head known by those skilful in the prior art. First, the CSS endurance test was conducted on the CSS zone at a position of radius 14.3 mm from the center of the substrate, and secondly stickiness measurement was made on the data zone at a position of radius 22 mm from the center of the substrate. These results are listed on Table 9 together with those of the comparative sample that was produced without any $SiN_x$ thin film 1203, but under substantially the same conditions for the other specifications. Table 9 shows the bump height with or without $SiN_x$ and the slide test results. It will be seen that the slide reliability of the magnetic disk having the $SiN_x$ thin film shown in this embodiment is substantially equivalent to that of the structure with no $SiN_x$ thin film.

TABLE 6

| THICKNESS OF $SiO_x$ (nm) | MATERIAL SYSTEM | FILM THICKNESS (nm) | LASER POWER (mW) | Q SWITCH FREQUENCY (kHz) | BUMP HEIGHT (nm) |
|---|---|---|---|---|---|
| 0 | Co-Cr30Ta8 | 25 | 60 | 40 | — |
|   |   | 50 | 60 | 40 | — |

TABLE 6-continued

| THICKNESS OF SiO$_x$ (nm) | MATERIAL SYSTEM | FILM THICKNESS (nm) | LASER POWER (mW) | Q SWITCH FREQUENCY (kHz) | BUMP HEIGHT (nm) |
|---|---|---|---|---|---|
| | | 100 | 60 | 30 | — |
| | | 100 | 60 | 40 | — |
| | | 200 | 60 | 16 | — |
| | | 200 | 60 | 32 | — |
| | | 200 | 60 | 40 | — |
| | | 200 | 150 | 64 | 10 |
| 10 | Co-Cr30Ta8 | 25 | 60 | 40 | 8 |
| | | 50 | 60 | 40 | 7 |
| | | 100 | 60 | 40 | 7 |
| | | 200 | 60 | 40 | 6 |
| 50 | Co-Cr30Ta8 | 25 | 60 | 40 | 9 |
| | | 50 | 60 | 40 | 8 |
| | | 100 | 60 | 40 | 7 |
| | | 200 | 60 | 40 | 6 |
| 200 | C0-Cr30Ta8 | 25 | 60 | 40 | 9 |
| | | 50 | 60 | 40 | 7 |
| | | 100 | 60 | 40 | 7 |
| | | 200 | 60 | 40 | 7 |
| 800 | Co-Cr30Ta8 | 25 | 60 | 40 | 10 |
| | | 50 | 60 | 40 | 7 |
| | | 100 | 60 | 32 | 15 |
| | | 100 | 60 | 40 | 7 |
| | | 200 | 60 | 16 | 22 |
| | | 200 | 60 | 32 | 14 |
| | | 200 | 60 | 40 | 7 |
| | | 200 | 150 | 64 | 20 |
| 0 | Cr-Si15 | 100 | 60 | 32 | — |
| | | 200 | 60 | 32 | — |
| 800 | Cr-Si15 | 100 | 60 | 32 | 15 |
| | | 200 | 60 | 32 | 13 |
| 0 | Cr-Ti20 | 100 | 60 | 32 | — |
| | | 200 | 60 | 32 | — |
| 800 | Cr-Ti20 | 100 | 60 | 32 | 14 |
| | | 200 | 60 | 32 | 12 |
| 0 | Cr-V20 | 100 | 60 | 32 | — |
| | | 200 | 60 | 32 | — |
| 800 | Cr-V20 | 100 | 60 | 32 | 14 |
| | | 200 | 60 | 32 | 12 |
| 0 | NiTi | 25 | 60 | 40 | — |
| | | 50 | 60 | 40 | — |
| | | 100 | 60 | 36 | — |
| | | 200 | 60 | 36 | — |
| 800 | NiTi | 25 | 60 | 40 | 12 |
| | | 50 | 60 | 40 | 10 |
| | | 100 | 60 | 36 | 18 |
| | | 200 | 60 | 36 | 16 |
| 0 | NiAl | 100 | 60 | 32 | — |
| | | 200 | 60 | 32 | — |
| 800 | NiAl | 100 | 60 | 32 | 19 |
| | | 200 | 60 | 32 | 15 |
| 0 | Co-Cr30Zr10 | 25 | 60 | 40 | — |
| | | 50 | 60 | 40 | — |
| | | 100 | 60 | 32 | — |
| | | 200 | 60 | 32 | — |
| 800 | Co-Cr30Zr10 | 25 | 60 | 40 | 10 |
| | | 50 | 60 | 40 | 8 |
| | | 100 | 60 | 32 | 16 |
| | | 200 | 60 | 32 | 15 |

TABLE 7

| | SiO$_x$ FILM 102 THICKNESS (nm) | ALLOY FILM 103 CoCr$_{30}$Ta$_8$ THICKNESS (nm) | LASER | | RING BUMP 104 | | | | STICTION | |
|---|---|---|---|---|---|---|---|---|---|---|
| | | | POWER (mW) | PULSE FREQUENCY (kHz) | BUMP DISTANCE PERIPHERAL × RADIUS (μm) | BUMP HEIGHT (nm) | FINE BUMP 105 | | CSS (R-19 mm) (mN) | (R-30 mm) (mN) |
| | | | | | | | BUMP DENSITY (×10$^{12}$/m$^2$) | BUMP HEIGHT (nm) | | |
| EMBODIMENT 1 | 800 | 100 | 60 | 40 | 10 × 10 | 15 | 54 | 10 | 10 | 83 |

TABLE 7-continued

| | SiO_x FILM 102 THICKNESS (nm) | ALLOY FILM 103 CoCr_30Ta_8 THICKNESS (nm) | LASER POWER (mW) | LASER PULSE FREQUENCY (kHz) | RING BUMP 104 BUMP DISTANCE PERIPHERAL × RADIUS (μm) | RING BUMP 104 BUMP HEIGHT (nm) | FINE BUMP 105 BUMP DENSITY (×10^12/m^2) | FINE BUMP 105 BUMP HEIGHT (nm) | CSS (R-19 mm) (mN) | STIC-TION (R-30 mm) (mN) |
|---|---|---|---|---|---|---|---|---|---|---|
| COMPARATIVE EXAMPLE 1 | 0 | 100 | 150 | 40 | 10 × 10 | 15 | 50 | 10 | 9 | 86 |

TABLE 8

| THICKNESS OF SiO_x (nm) | MATERIAL SYSTEM | FILM THICKNESS (nm) | LASER POWER (mW) | Q SWITCH FREQUENCY (kHz) | BUMP HEIGHT (nm) |
|---|---|---|---|---|---|
| 0 | Co-Cr30Ta8 | 25 | 60 | 32 | — |
| | | 50 | 60 | 32 | — |
| | | 100 | 60 | 32 | — |
| | | 200 | 60 | 32 | — |
| | | 200 | 150 | 64 | 10 |
| 10 | Co-Cr30Ta8 | 25 | 60 | 32 | 12 |
| | | 50 | 60 | 32 | 10 |
| | | 100 | 60 | 32 | 7 |
| | | 200 | 60 | 32 | 6 |
| 100 | Co-Cr30Ta8 | 25 | 60 | 32 | 15 |
| | | 50 | 60 | 32 | 13 |
| | | 100 | 60 | 32 | 10 |
| | | 200 | 60 | 32 | 6 |
| 800 | Co-Cr30Ta8 | 25 | 60 | 32 | 20 |
| | | 50 | 60 | 32 | 17 |
| | | 100 | 60 | 32 | 15 |
| | | 200 | 60 | 32 | 12 |
| | | 200 | 150 | 64 | 21 |
| 0 | NiTi | 25 | 60 | 32 | — |
| | | 50 | 60 | 32 | — |
| | | 100 | 60 | 32 | — |
| | | 200 | 60 | 32 | — |
| 800 | NiTi | 25 | 60 | 32 | 17 |
| | | 50 | 60 | 32 | 15 |
| | | 100 | 60 | 32 | 12 |
| | | 200 | 60 | 32 | 10 |
| 0 | Co-Cr30Zr10 | 25 | 60 | 32 | — |
| | | 50 | 60 | 32 | — |
| | | 100 | 60 | 32 | — |
| | | 200 | 60 | 32 | — |
| 800 | Co-Cr30Zr10 | 25 | 60 | 32 | 16 |
| | | 50 | 60 | 32 | 13 |
| | | 100 | 60 | 32 | 11 |
| | | 200 | 60 | 32 | 8 |

TABLE 9

| | SiO_x FILM 203 THICKNESS (nm) | ALLOY FILM 204 CoCr_30Ta_8 THICKNESS (nm) | LASER POWER (mW) | LASER PULSE FREQUENCY (kHz) | RING BUMP 205 BUMP DISTANCE PERIPHERAL × RADIUS (μm) | RING BUMP 205 BUMP HEIGHT (nm) | FINE BUMP 202 BUMP DENSITY (×10^12/m^2) | FINE BUMP 202 BUMP HEIGHT (nm) | CSS (R-14.3 mm) (mN) | SIC-TION (R-22 mm) (mN) |
|---|---|---|---|---|---|---|---|---|---|---|
| EMBODIMENT 1 | 800 | 100 | 60 | 32 | 10 × 10 | 15 | 55 | 10 | 9 | 82 |
| COMPARATIVE EXAMPLE 1 | 0 | 100 | 100 | 32 | 10 × 10 | 15 | 52 | 10 | 9 | 86 |

What is claimed is:

1. A magnetic recording medium comprising:

a non-ferromagnetic disk substrate;

minute bumps on the substrate formed by sputtering a target that chiefly contains an intermetallic compound;

secondary bumps formed by irradiating a laser beam on the surface in a Contact Start/Stop (CSS) zone of said substrate with said minute bumps having been formed;

a magnetic recording film on said substrate; and a protective film on said magnetic recording film.

2. A magnetic recording medium comprising:

a non-ferromagnetic disk substrate;

a non-ferromagnetic metal thin film on the substrate;

a magnetic recording film on said metal thin film;

minute bumps on the magnetic recording film by sputtering a target that chiefly contains an intermetallic compound;

secondary bumps formed by irradiating a laser beam on the surface in a Contact Start/Stop (CSS) zone of said magnetic recording film with said minute bumps having been formed; and a protective film on said magnetic recording film.

* * * * *